United States Patent
Kinsella

(10) Patent No.: US 11,049,331 B2
(45) Date of Patent: Jun. 29, 2021

(54) CUSTOMIZATION METHOD AND APPARATUS

(71) Applicant: HEARABLES 3D PTY LTD, Victoria (AU)

(72) Inventor: Philip Kinsella, Blackburn South (AU)

(73) Assignee: HEARABLES 3D PTY LTD, Melbourne (AU)

( * ) Notice: Subject to any disclaimer, the term of this patent is extended or adjusted under 35 U.S.C. 154(b) by 0 days.

(21) Appl. No.: 16/768,362

(22) PCT Filed: Dec. 3, 2018

(86) PCT No.: PCT/AU2018/051292
§ 371 (c)(1),
(2) Date: May 29, 2020

(87) PCT Pub. No.: WO2019/104397
PCT Pub. Date: Jun. 6, 2019

(65) Prior Publication Data
US 2020/0342684 A1    Oct. 29, 2020

(30) Foreign Application Priority Data
Dec. 1, 2017    (AU) .................................. 2017904863

(51) Int. Cl.
*G06T 19/20* (2011.01)
*G06T 17/20* (2006.01)
(52) U.S. Cl.
CPC ............ *G06T 19/20* (2013.01); *G06T 17/205* (2013.01); *G06T 2210/41* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

2008/0137949 A1* 6/2008 Zouhar .................. B33Y 50/00
                                                                382/168
2008/0143712 A1   6/2008 McBagonluri et al.
(Continued)

FOREIGN PATENT DOCUMENTS

WO    WO 2011/127940 A1    10/2011
WO    WO 2016/181282 A1    11/2016

OTHER PUBLICATIONS

Darkner, Sune, Rasmus Larsen, and Rasmus R. Paulsen. "Analysis of deformation of the human ear and canal caused by mandibular movement." International Conference on Medical Image Computing and Computer-Assisted Intervention. Springer, Berlin, Heidelberg, 2007.*

(Continued)

*Primary Examiner* — Ryan M Gray
(74) *Attorney, Agent, or Firm* — Bookoff McAndrews, PLLC

(57) ABSTRACT

A customization method and system for producing a product design customized for a selected environment by determining a deformation field between a mean shape of a 3D statistical shape model (SSM) of the selected environment to a new 3D scan by fitting the SSM to the new 3D scan data. And using the deformation field to deform a mesh of an existing Computer Aided Design (CAD) model of a product.

20 Claims, 25 Drawing Sheets

(56) References Cited

U.S. PATENT DOCUMENTS

| | | | |
|---|---|---|---|
| 2009/0116731 A1* | 5/2009 | Melkisetoglu | G06K 9/00201 382/154 |
| 2010/0100362 A1* | 4/2010 | Zouhar | H04R 25/658 703/2 |
| 2010/0232686 A1 | 9/2010 | Dewan et al. | |
| 2011/0093108 A1 | 4/2011 | Ashby et al. | |
| 2013/0166256 A1 | 6/2013 | Wirx-Speetjens et al. | |
| 2014/0343900 A1* | 11/2014 | Goldstein | G02C 13/003 703/1 |
| 2015/0186748 A1 | 7/2015 | Cootes et al. | |
| 2016/0314597 A1 | 10/2016 | Ishikawa et al. | |
| 2017/0068774 A1 | 3/2017 | Cluckers et al. | |
| 2017/0157400 A1 | 6/2017 | Noble et al. | |
| 2018/0204341 A1* | 7/2018 | Kaneko | A61B 5/1079 |

OTHER PUBLICATIONS

Sickel, Konrad, et al. "Toward automation in hearing aid design." Computer-Aided Design 43.12 (2011): 1793-1802.*

Darkner, Sune, et al. "Analysis of surfaces using constrained regression models." International Conference on Medical Image Computing and Computer-Assisted Intervention. Springer, Berlin, Heidelberg, 2008.*

Jensen, Rasmus R., et al. "Statistical surface recovery: a study on ear canals." Workshop on Mesh Processing in Medical Image Analysis. Springer, Berlin, Heidelberg, 2012.*

Kinsella, Philip. Analysis and design of in-ear devices. Diss. Swinburne University of Technology, 2018.*

Pujadas, Esmeralda Ruiz, et al. "Random walks with shape prior for cochlea segmentation in ex vivo $\mu\text{hbox}\{CT\}$ μ CT." International journal of computer assisted radiology and surgery 11.9 (2016): 1647-1659.*

International Search Report issued in International Application No. PCT/AU2018/051292 dated Feb. 13, 2019 (6 pages).

Danckaers, F. et al., 'Correspondence preserving elastic surface registration with shape model prior', IEEE 22nd International Conference on Pattern Recognition, 2143-2148, Aug. 2014.

Jakob et al., 'Instant field aligned meshes', ACM Trans. Graph., 34(6):189, 2015.

Huang et al., 'Functional Map Networks for Analyzing and Exploring Large Shape Collections', ACM Trans. Graph. 33, Article 36, 2014.

Rustamov et al., 'Map-based exploration of intrinsic shape differences and variability', ACM Transactions on Graphics (TOG), 32(4):72, 2013.

Rodolà et al., 'Point-wise map recovery and refinement from functional correspondence', arXiv preprint arXiv: 1506.05603, 2015.

Myronenko et al., 'Non-rigid point set registration: Coherent point drift.' In Advances in Neural Information Processing Systems 19—Proceedings of the 2006 Conference, pp. 1009-1016, 2007.

Bustard and Nixon, '3d morphable model construction for robust ear and face recognition', Computer Vision and Pattern Recognition (CVPR), 2010 IEEE Conference on, pp. 2582-2589. IEEE, 2010.

Masuda et al., 'Preserving form features in interactive mesh deformation', Computer-Aided Design, 39(5):361-368, 2007.

Sorkine and Alexa, 'As-rigid-as-possible surface modeling', 2007.

* cited by examiner

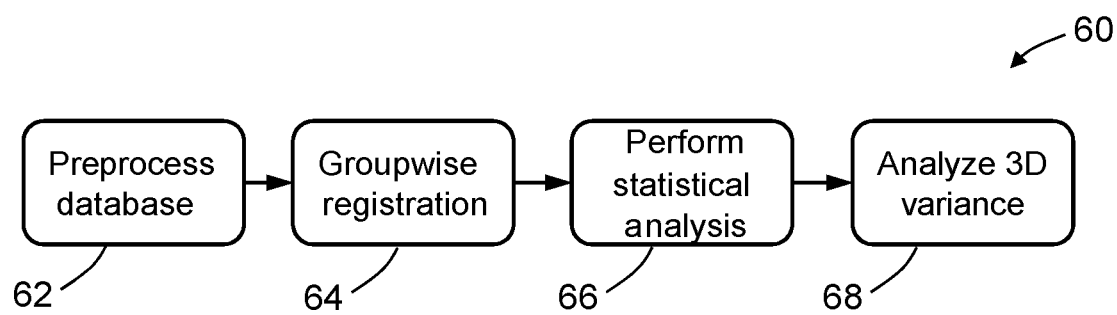
Figure 6
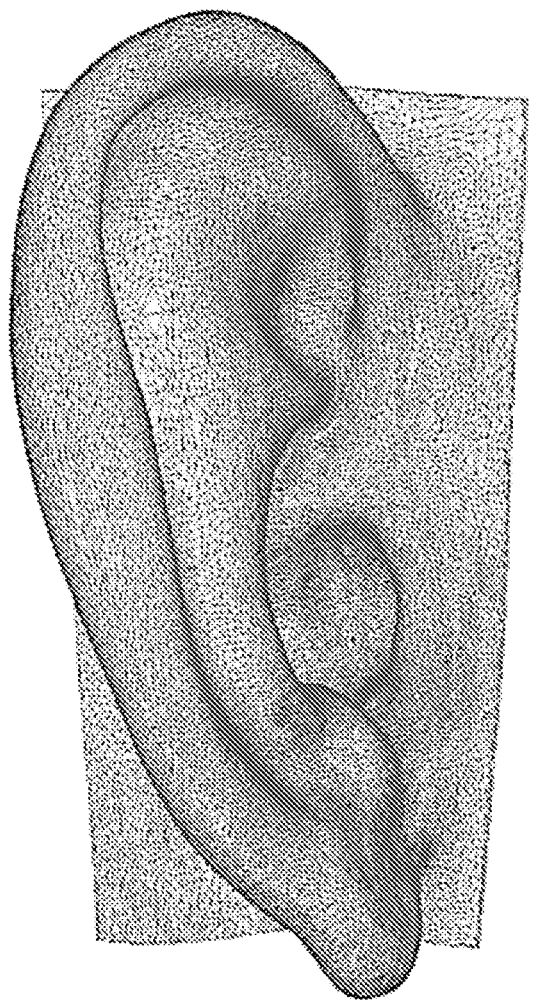
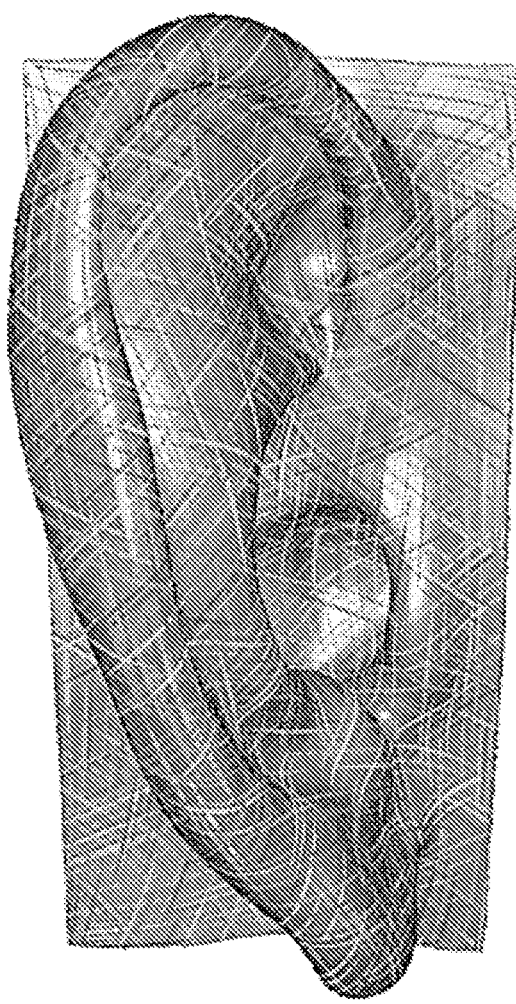
Figure 7A          Figure 7B

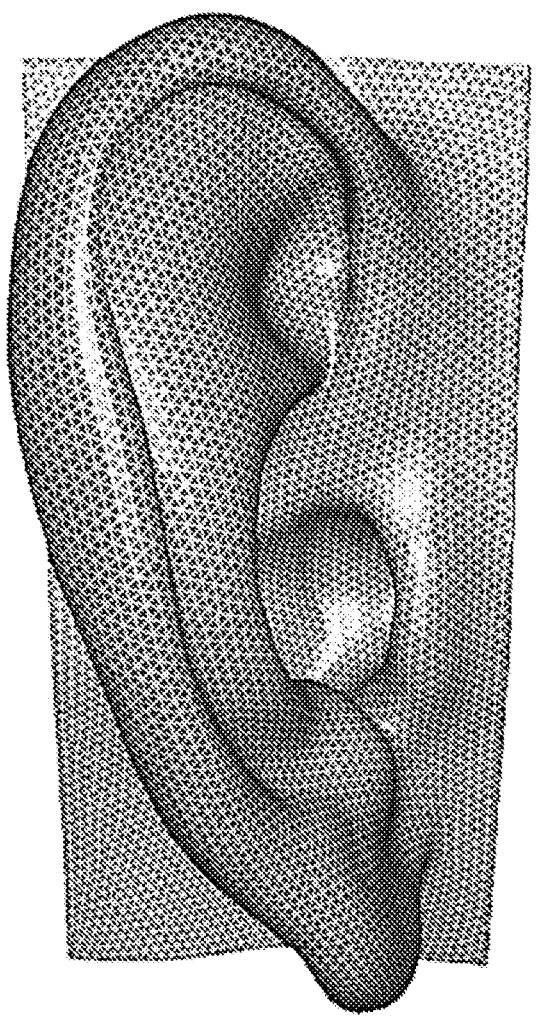 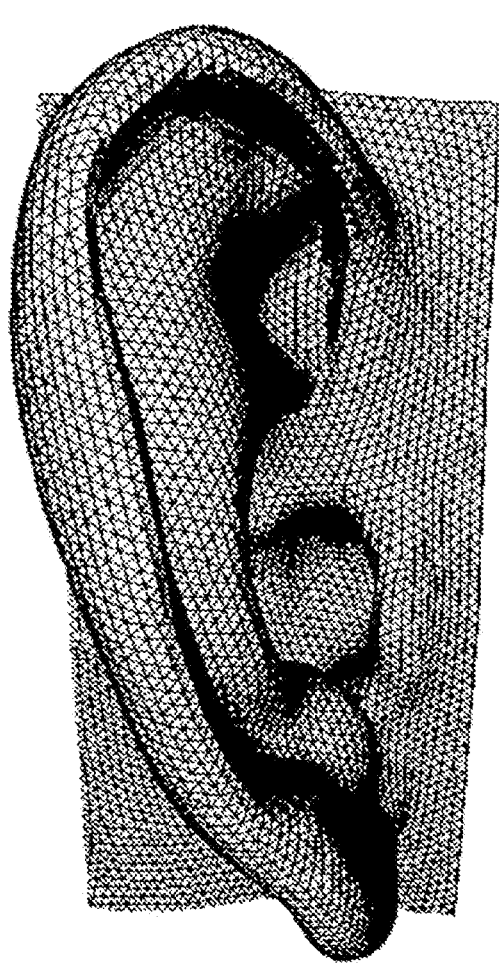
Figure 7C    Figure 7D
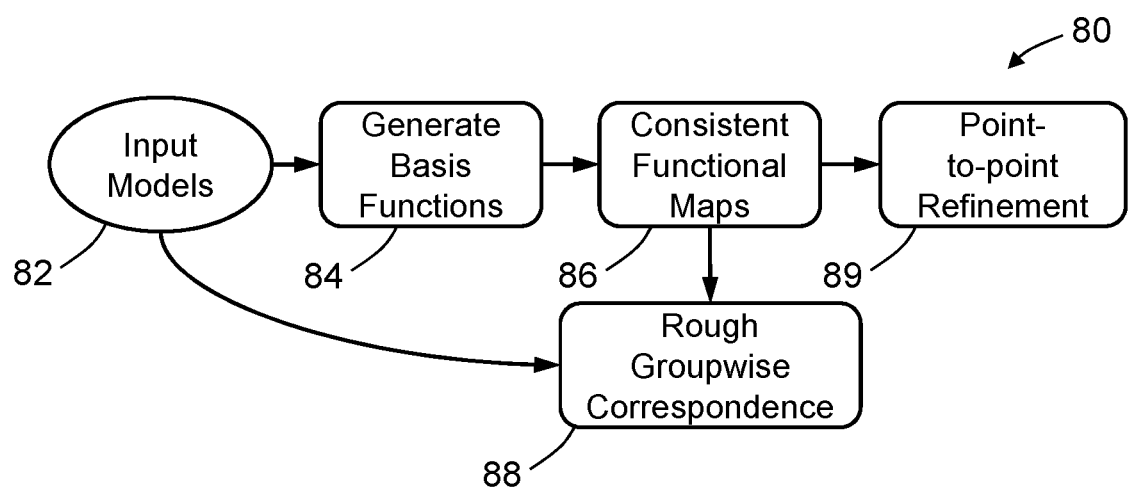
Figure 8

-2σ ◄------ Mean ------► +2σ

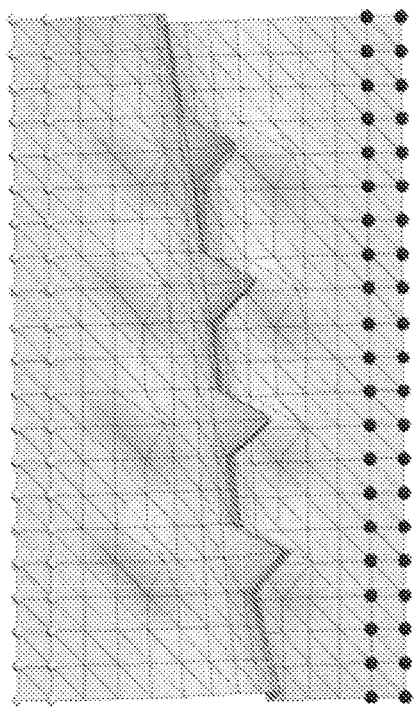
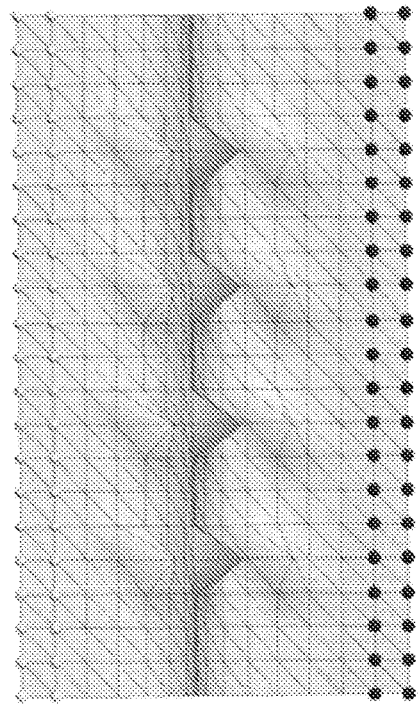
Figure 21D          Figure 21E
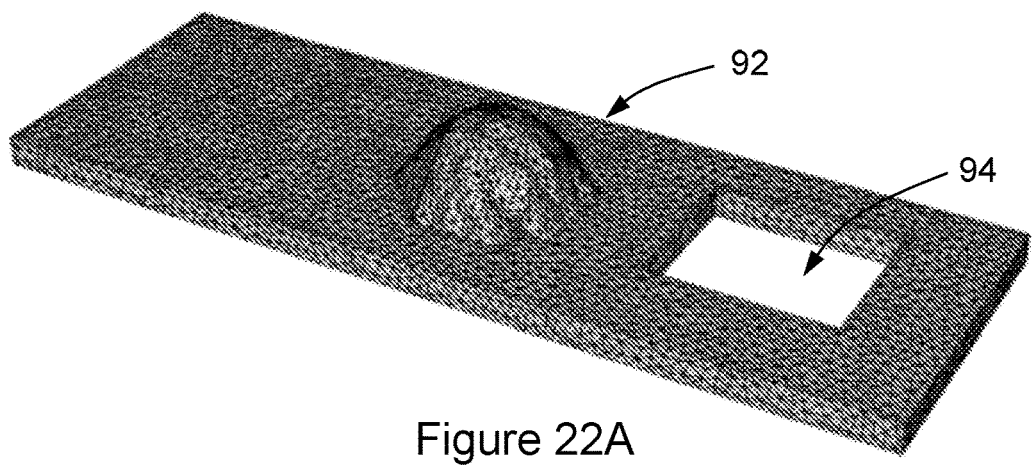
Figure 22A
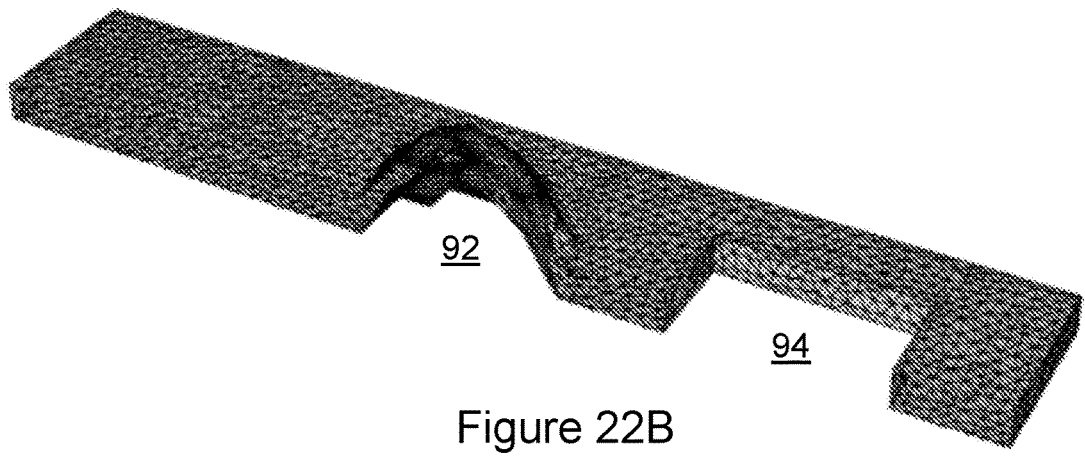
Figure 22B

CUSTOMIZATION METHOD AND APPARATUS

CROSS-REFERENCE TO RELATED APPLICATIONS

This application is the U.S. national phase entry under 35 U.S.C. § 371 of International Application No. PCT/AU2018/051292, filed on Dec. 3, 2018, which claims priority to Australian Patent Application No. 2017904863, filed on Dec. 1, 2017.

TECHNICAL FIELD

The present invention relates to a customization method and apparatus, of particular but by no means exclusive application in the prototyping and manufacture of wearable devices such as those on or in the ear.

BACKGROUND

The human ear is used to accommodate a wide variety of devices, such as earphones, hearing aids, Bluetooth devices and health monitors. However, the design of the majority of such devices employ percentiles derived from anthropometric data, which results in—for most users—ill-fitting devices. Custom-fit in- or on-ear devices have been developed to improve comfort and functionality, but they can cost hundreds to thousands of dollars and take several days for processing.

Two existing approaches in research and industry attempt to solve the customization problem, referred to as generative and parametric design. In generative design, the objective is to take a 3D scan and manufacture the custom-fit device in a step-by-step manner, similar to the way in which a person would design a product. This process depends on the detection of anatomical landmarks on the surface of the 3D scan data, such that cutting planes can be placed at predetermined locations that define the in-ear device shape. However, the detection of landmarks requires a significant amount of work in the detection and pre-processing of these landmark positions, which limits its application in high paced, consumer-driven industries such as earphones or hearing aids.

Parametric design is synonymous with CAD processes where the product design can be globally updated by changing a parameter (i.e. a distance between points or an edge length). In a realistic scenario, a product design consists of numerous parameters, usually either distances, formulae, or angles to name a few. For automation, the process detects anatomical landmarks on the surface of the 3D scan data which coincide with a parametric constraint in the CAD design. The CAD design is then updated to match the detected landmarks.

This approach, while powerful, reduces the high-density 3D scan data into a sparse set of landmarks, thereby removing the complex curvature and structural information relevant to, for example, the human body.

SUMMARY OF THE INVENTION

According to a first broad aspect, the present invention provides a customization method for producing a product design customized for a selected environment, the method comprising:

determining a deformation field between a mean shape of a 3D statistical shape model (SSM) of the selected environment to a new 3D scan by fitting the SSM to the new 3D scan data; and deforming a mesh of an existing Computer Aided Design (CAD) model of a product according to the deformation field including (i) estimating and preserving at least one local rotation (and hence local detail) by preserving at least one normal to a surface of the product, and (ii) preserving a form of one or more selected components of the product using at least one of the preserved local rotation.

Thus, an existing CAD design is fitted to a new 3D scan, using what is referred to herein as as-constrained-as-possible (ACAP) form preservation.

In an embodiment, the as-constrained-as-possible form preservation includes approximating local rotations for each of a plurality of vertex cells, and estimating vertex positions by solving a Laplacian system. The method may include varying the Laplacian system according to user-selected constraints (which allows form and position constraints to be added).

In an embodiment, the method includes generating the SSM of the selected environment from 3D scan data from one or more 3D scans of the selected environment.

In an embodiment, the method includes creating a deformation field by registering the 3D scan data to the SSM.

In an embodiment, the method includes creating the SSM by registering the 3D scan data to the SSM such that the SSM comprises a 3D model of a same topology and distribution as the 3D scan data.

In an embodiment, the method includes minimizing stretching and/or bending energy to achieve realistic surface deformation.

In an embodiment, the method includes preserving local rigidity by splitting a surface of the product into overlapping cells and minimizing a transformation in each of the cells to be as-rigid-as-possible.

A cell, in this case, is the one-ring neighbourhood of a vertex. Referring to FIG. 20 the one-ring is referring to the first set of connected vertices (f1-f6) to source vertex (f0).

In an embodiment, the method includes iterative rotation estimation.

In an embodiment, the method includes generating a tetrahedral mesh (such as with the TetGen method), constrained to preserve volume and to not introduce new vertices into the mesh.

In an embodiment, the method generates the SSM without employing detection or manual annotation of landmarks.

Typically, the method includes receiving or accessing the CAD model (which would generally include all the functional components of the product, such as mounting holes or split lines for manufacture).

The CAD model may have been prepared using any standard Computer Aided Design environment.

In comparison to the generative design approach, this method need not rely on the detection of landmarks on the surface. It begins with the end-product such that a standard CAD design process can be used, thus leveraging the ability to be able to design a range of products and integrate them into the automation framework with minimal additional work.

The product may be, for example, an in-ear device, such as earphones, earplugs (such as for minimizing noise, swimmers' ear or surfers' ear), and hearing aids, and the selected environment may be the portion of an ear that is to accommodate the in-ear device. Likewise, the product may be a medical product, such as a cast, a support or splint, a health monitor, or an implant or prosthetic (such as for cosmetic surgery). The product may alternatively be a consumer product, such as a component of a pair of spectacles, an orthotic or a piece of jewellery.

According to a second broad aspect, the present invention provides a customization apparatus for producing a product design customized for a selected environment, the apparatus comprising:

a statistical shape model (SSM) generator for generating a 3D statistical shape model (SSM) of the selected environment from 3D scan data of the selected environment; and a mesh deformer configured to deform a mesh of an existing Computer Aided Design (CAD) model of a product according to the SSM to fit the 3D scan data, comprising (i) estimating and preserving at least one local rotation (and hence local detail) by preserving at least one normal to a surface of the product, and (ii) preserving a form of one or more selected components of the product based at least on the at least one local rotation.

In an embodiment, the statistical shape model generator includes a pre-processer that uniformly distributes the vertices and faces across 3D scan data while preserving overall features (in order to alleviate processing difficulty), a groupwise registrar that non-rigidly registers models to a mean, a statistical analyzer and/or a variance analyzer. Again, the SSM is not reliant on the detection or processing of landmarks, but utilizes the entirety of the 3D scan data.

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention can be more clearly ascertained, embodiments will now be described, by way of example, with reference to the accompanying drawings, in which:

FIG. 6 is a view of the process for generating a statistical shape model (SSM) consisting of pre-processing, groupwise registration, statistical analysis and variance analysis according to this embodiment;

FIGS. 7A to 7D are views of pre-processing of an input mesh showing the uniform distribution of vertices and faces while maintaining the overall features including, respectively, original mesh, orientation field, position field and uniform output;

FIG. 8 is a view of the process of generating point-to-point correspondences from functional maps according to this embodiment;

FIGS. 21A to 21E illustrate the deformation of a test piece according to this embodiment, with one region remaining fixed and another region deformed [0.5 -1 -1] in the x, y, z directions respectively;

FIGS. 22A to 22C illustrate tetrahedral mesh generation according to this embodiment, to preserve the volume of the mesh during ACAP deformation;

FIG. 28A shows the mean shape of the SSM, FIG. 28B the input 3D scan in its raw state, i.e. directly from the 3D scanner, and FIG. 28C the fitted 3D scan using the SSM, illustrating the improvement in topology, orientation, noise control, and occlusion;

FIG. 29A shows the mean shape of the SSM, FIG. 29B a fitted 3D scan using the SSM, and FIG. 29C the deformation field that occurs by deforming the mean shape to match the new fitted model;

FIG. 31A is the deformed earpiece, FIG. 31B the deformed earpiece relative to the input 3D scan, and FIG. 31C a comparison of the original earpiece, shown transparent, and the newly deformed earpiece.

DETAILED DESCRIPTION

Figure 1:
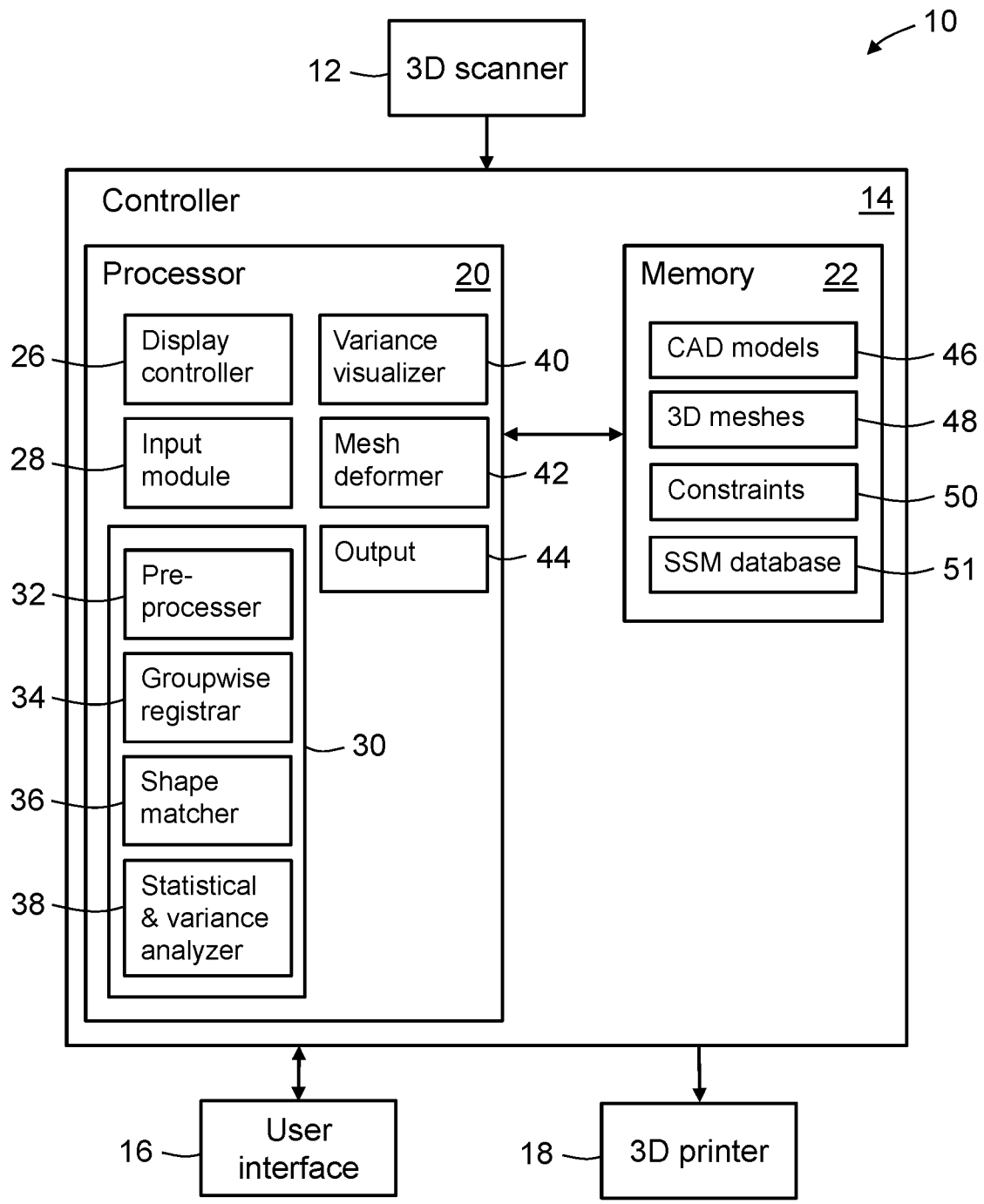
FIG. 1 is a schematic diagram of a customization apparatus according to an embodiment of the present invention.

According to an embodiment of the present invention, there is provided a customization apparatus, shown schematically at 10 in FIG. 1, applied—in this example—to the customization of an in-ear device using a 3D statistical shape model and as-constrained-as-possible mesh deformation. Apparatus 10 includes a 3D scanner 12, a controller 14, a user interface 16 and a 3D printer 18. Processor 14 includes at least one processor 20 and memory 22. Controller 14 also includes various standard components, omitted for clarity, including an I/O bus and a network card. Likewise, memory 22 may include various forms of memory, such as RAM and a mass storage device. User interface 16 may include one or more displays, a keyboard and a computer mouse. User interface 16 may include 3D printer 18, though the latter is shown as a separate component in this figure. It will be appreciated that apparatus 10 may be a distributed device, such as with controller 14 located remotely from 3D scanner 12 and/or 3D printer 18, and in suitable electronic components, to allow—for example— remote processing of data received from 3D scanner. Also, at least some of memory 22 may be located remote from processor 20, such that—for example—certain data may be stored and accessed remotely.

Processor 20 includes a display controller 26 for controlling the display of the user interface 16, an input module 28, a statistical shape model (SSM) generator 30 that includes a pre-processer 32, a groupwise registrar 34 (which registers all models to a mean), a shape matcher 36, and a statistical and variance analyzer 38. Processor 20 also includes a variance visualizer 40, a mesh deformer 42 and an output 44 that outputs the results to user interface 16 and/or 3D printer 18.

Memory 22 includes a CAD model database 46 of existing CAD models (such as of an in-ear device), an 3D mesh database 48 of one or more meshes, a constraint database 50 of user-selected constraints to be imposed on an input 3D mesh, and an SSM database 51 for storing SSMs once generated by SSM generator 30 for subsequent use (in particular by mesh deformer 42). The meshes are input from 3D scanner 12 (of a proposed environment, such as an ear, that should accommodate the ultimate customized product).

The input 3D meshes are scans captured from individuals, but typically stored after pre-processing to reduce noise and for consistency, as is described in further detail below.

Input module 28 receives 3D scan data from 3D scanner 12 and saves it to 3D mesh database 48.

SSM generator 30 generates a dense 3D statistical shape model (SSM) that can be used to generate an estimate or approximation of the input 3D shape (from 48) that is essentially error free and that predicts any areas of the input 3D scan that were not accurately reconstructed. The SSM need only be generated once in any particular case, so is stored in SSM database 51 for subsequent use in customization. The SSM is then subsequently used as the basis for individual customisation by scanning and deformation.

In the context of scanning for a new customisation, fitting of the SSM to input 3D scan data can be used to fix any topology errors—removing noise or error artefacts from the 3D scan. This fitting process is also used for generation of the deformation field used for customising for the individual subject of the 3D scan. More specifically, the fitting of the SSM to the input 3D scan generates a best approximate shape and how the mean shape deforms to achieve this new shape. The deformation from the mean shape of the SSM to a new input 3D scan can then be used to deform a pre-defined 3D CAD model from CAD model database 46 to an ultimate final custom-fit shape. The benefit of this approach is its ability to interpolate occluded areas, fix poorly scanned areas, and enforce similar topology to the SSM.

As discussed above the SSM need only be generated once. An SSM is a compressed representation of shape variation within a dataset and allows the user to construct the desired standard deviation for which to assess size and fit. The SSM is created using dense 3D scan data as its basis, as opposed to landmark data. The SSM is generated from a plurality of high resolution and high accuracy 3D scans. The aim of the SSM generation is to establish, given population of shapes in correspondence, what are the main modes of shape variation and how each of these modes of shape variation contribute to the shape of a subject object—where in this example the subject object is the human ear. In the example of a human ear, tens to hundreds of 3D ear scans are processed by a pre-processer 32 of SSM generator 30 to uniformly distribute the vertices and faces across the 3D scan data while preserving the overall features. This pre-processing has an advantage of reducing the processing complexity for matching or comparing the scan data from different subjects. For example, the output of a 3D scanning system is a high density 3D model of the target surface, in this case the human ear. However, the user has no control over the positioning or localised density of the vertex distributions in this high density 3D model. Thus, the 3D models can be pre-processed to uniformly distribute the vertices and faces across the mesh of the 3D model while preserving the overall features. Uniformly distributing the vertices and faces improves the reliability, and reduced processing required, for generating one to one correspondences between vertices of different 3D models, derived from scans of different subjects. Pre-processing is described in further detail below.

Following the pre-processing each of the 3D models (of different subjects) each of these input models is registered to a mean shape. The mean shape can be iteratively refined from a selected model in the data set, for example a model may be arbitrarily selected or a model may be selected that is close to the mean based on variance analysis. Groupwise registrar 34 registers the 3D scan data to the selected model. The initial selection of a model from the data set to use as the mean shape is not overtly critical to the output of the SSM, as the mean shape is refined from the initially selected model based on a functional maps approach, which can be represented as matrices of linear transformation between basis functions on a shape to enable definition of transformations between shapes.

Shape matcher 36 of SSM generator 30 implements a non-rigid shape matching process in the form of 'Functional Maps' (described in greater detail below), which allows for a one-to-one correspondence to be generated between shapes. In the process of generating the SSM this maps each scan to the selected mean shape.

Simply generating a functional map network between a collection of shapes does not allow for a SSM to be constructed. Statistical and variance analyzer 38 is then used to process the groupwise one-to-one correspondences into a statistical shape model (SSM), which is a compressed representation of the variation within the dataset.

The statistical analysis performed by statistical and variance analyser 38 generates the mean shape (which is use for the design) and standard deviation (i.e. the variance in the dataset), from any shape can be reconstructed along the normal distribution and—in this embodiment—the mean shape and standard deviation can be used to predict the shape of the ear from an input 3D scan and deform the CAD design.

The SSM may also be regenerated or adjusted, particularly as more 3D scan data becomes available.

It should be appreciated that the SSM generator 30 generates the mean shape of the dataset, which is a valuable asset for designing the product, especially using 3D CAD design tools, and also generates the principal components that form the basis for how the SSM predicts input 3D scans.

Once the SSM is generated, this can be utilised for subject specific customisation. This customisation process utilised some of the same processing as for SSM generation—but for the purpose of determining the deformation of the mean shape to the 3D scan for the customisation target—how the mean shape needs to be deformed to fit the scanned ear.

For a new customisation, the 3D scan data for the subject is input, and the pre-processer 32 of SSM generator 30 uniformly distributes the vertices and faces across the 3D scan data while preserving the overall features, in order to alleviate processing difficulty.

Groupwise registrar 34 registers the 3D scan data to an SSM and shape matcher 36 of SSM generator 30 implements a non-rigid shape matching process in the form of 'Functional Maps' (described in greater detail below), which allows for a one-to-one correspondence to be generated between shapes—in the case of a new customisation between the mean shape and the 3D scan for the customisation.

By registering a 3D scan to the SSM, groupwise registrar 34 creates a deformation field, that is, a per-vertex motion from the mean shape to the shape of the 3D scan.

SSM generator 30 can also predict areas that were occluded during 3D scanning.

Variance visualizer 40 generates, if desired, a visualization of a scalar field on the surface of the shape that, though not used in the generation of the customized design, represents the distance between the mean shape and the selected standard deviation. This can be useful in the design process to establish the bounds for the custom fit product. In the context of in-ear devices to establish the bounds to which the in-ear device should fit, for example, if the in-ear device requires electronics to be placed in the inner shell. By varying the SSM the designer will know if the electronics are too big for the targeted population.

Mesh deformer 42 transfers the deformation field created by groupwise registrar 34 to the 3D CAD design (in 46), a process that involves deforming the 3D CAD design to fit the input 3D scan (in 48) using a technique termed 'as-constrained-as-possible' (ACAP) mesh deformation.

Thus, in broad terms, the method implemented by apparatus 10 utilizes a 3D statistical shape model (SSM) of a customisation object (in this example, the human ear) with raw 3D scan data from the target subject for customisation (a scan of a person's ear) for the automatic design of custom-fit devices, using a 3D SSM that does not rely on the detection or placement of sparse landmarks on the 3D shape. This allows for the full range of structure and curvature of the ear to be taken into account during the customization process. This approach also means that low cost imaging systems can be used to generate satisfactory scan data. In addition, the method includes constraining deformation so that important features in the design (such as mounting holes or acoustic vents) are preserved.

With the advancement of 3D scanning and rapid prototyping there is the possibility to reduce these costs and make customization more accessible. Some embodiments solve the complexity of delivering mass-customized devices to the masses at a reasonable cost and time, using a framework developed based on automatic 3D scanning systems and automation algorithms for the design and rapid manufacture of customized in-ear devices. The automation can enable use of low-cost automatic 3D scanning systems, thus providing mass market accessibility. However, other embodiments are also envisaged. This customization framework uses a high resolution 3D SSM of the human ear, a pre-designed CAD part, and ACAP deformation to generate a custom-fit in-ear devices without the need to have a trained expert at any stage of the process.

By registering new data, i.e. a 3D scanned individual, to the statistical shape model, a deformation field is induced which is then used to transform the fitting whilst maintaining the form in critical regions such as mounting holes or split lines. The fitting is then rendered as a CAD product that matches the newly scanned individual. Through experimentation it has been found that the present embodiment can automatically produce custom-fit in-ear devices without interference from a trained expert.

Technology Description

Figure 2:
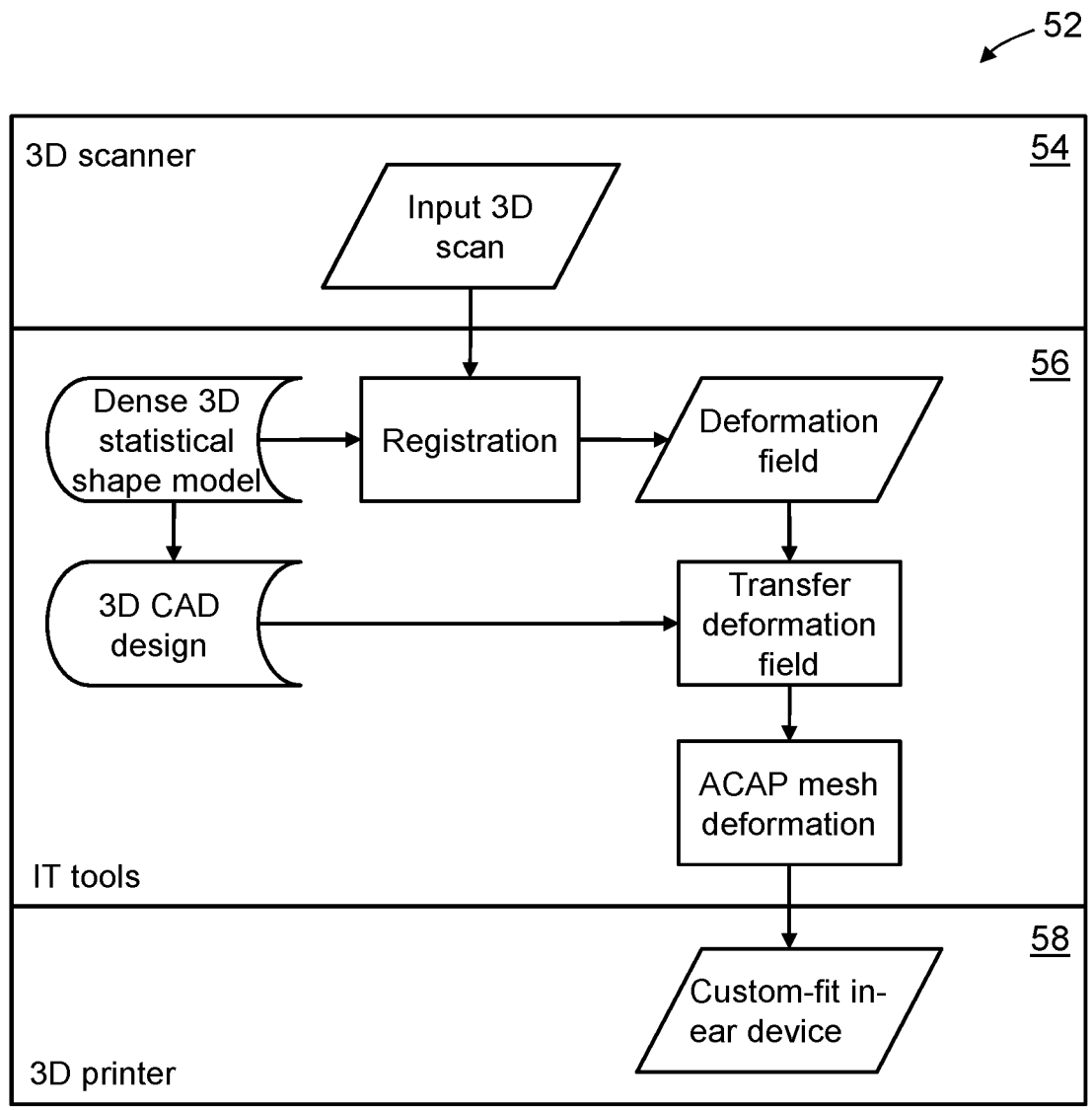
FIG. 2 is a schematic view of the automated customization method implemented by the apparatus of FIG. 1, according to this embodiment.

The method according to this embodiment and implemented by apparatus 10 has two main components. This is illustrated schematically in FIG. 2, a schematic view of the automated customization method 52 implemented by apparatus 10 of FIG. 1 and resolved into these two main components: the 3D scanning 54 with 3D scanner 12 of the selected, proposed environment (e.g. a human ear), and the deformation 54 of the 3D CAD model of a fitting to allow automated manufacturing of the customized product, in this example in-ear devices such as earphones, hearing aids, or earplugs. In addition, method 52 may ultimately include the 3D printing 58 of a customized product with 3D printer 18.

In this process, a dense 3D statistical shape model (SSM) is used to guide the deformation of a pre-defined 3D CAD model to the final custom-fit shape. Specifically, input 3D scan data is registered to the SSM such that a 3D model of the same topology and distribution is created. The SSM also has the means to predict areas that were occluded during 3D scanning. By registering a 3D scan to the SSM it creates a deformation field (i.e. a per-vertex motion from the mean shape to the shape of the 3D scan). This deformation field is transferred to the 3D CAD design which undergoes a deformation to fit the input 3D scan using a novel mesh deformation technique, which is designated "as-constrained-as-possible" (ACAP) mesh deformation.

For customisation for an individual the process works directly from 3D scan data captured from the individual, for example a 3D scan of the ear, A significant advantage of the customisation method disclosed herein is the fact that there is no need for any manual manipulation of the 3D scan data. The 3D scan data does not need to be modified, or labelled, by the individual or a technician operating the system for each individual customisation. The system provides a mathematical approach enabling purely automated operation, using a generated SSM after the initial CAD design is provided, without the necessity for a trained expert to manually annotate or alter the data in anyway. This creates a completely stand-alone customization framework.

The SSM is compiled from a database of high resolution and high accuracy 3D scans, whereas the input 3D scan data can have relatively low resolution and some occlusions.

Compared to current customization technology, which is predominantly manual or utilizes a complex and limited automation framework, the developed approach requires no skilled operator input and is robust, repeatable, and low cost.

Mesh Deformation Process

As-constrained-as-possible (ACAP) mesh deformation was developed so that the CAD design that is deformed to fit the input 3D scan maintains the critical features such as mounting holes or acoustic vents. In the background art, customization is performed as a parametric model where the distance between predefined features is set, and when updated creates a new model automatically. However, according to the present embodiment, the model is deformed to fit the input 3D scan while maintaining a set of predefined constraints. Using this approach, it is possible to create more complex deformations that fit to the full curvature of the human body. By applying a wide set of constraints including shape, form, volume, position, relative position, and normal position it is possible to create a robust and reliably mesh deformation approach.

Greater Detail

As mentioned above, the method includes constructing a 3D database of, in this example, the ear. The database may include upwards of 100 3D scans of the human ear. The data in the database comprises unordered points and faces in three-dimensional space, which can be transformed into an SSM through the annotation of each individual 3D scan, or by automated processing as described herein.

The 3D scan data is analyzed to establish a base variance across the full database of 3D scans. Using the 3D (ear) database as initially constructed, it is possible to perform some level of customization, but insufficiently reliably for many applications. That is, it may not be possible to determine whether the selected data covers the necessary shape variation of the population without analyzing each sample independently, which would add additional processing that is potentially unnecessary. A SSM alleviates the necessity to analyze each sample independently, as it compresses the shape variation and allows the user to construct the desired standard deviation for which to assess size, fit, or comfort. It will be noted that, in the development of the SSM, the 3D database is modified sufficiently that extremities on the normal distribution can be accurately reconstructed by the SSM (as a part of the data generation rather than of the customization process).

Figure 3:
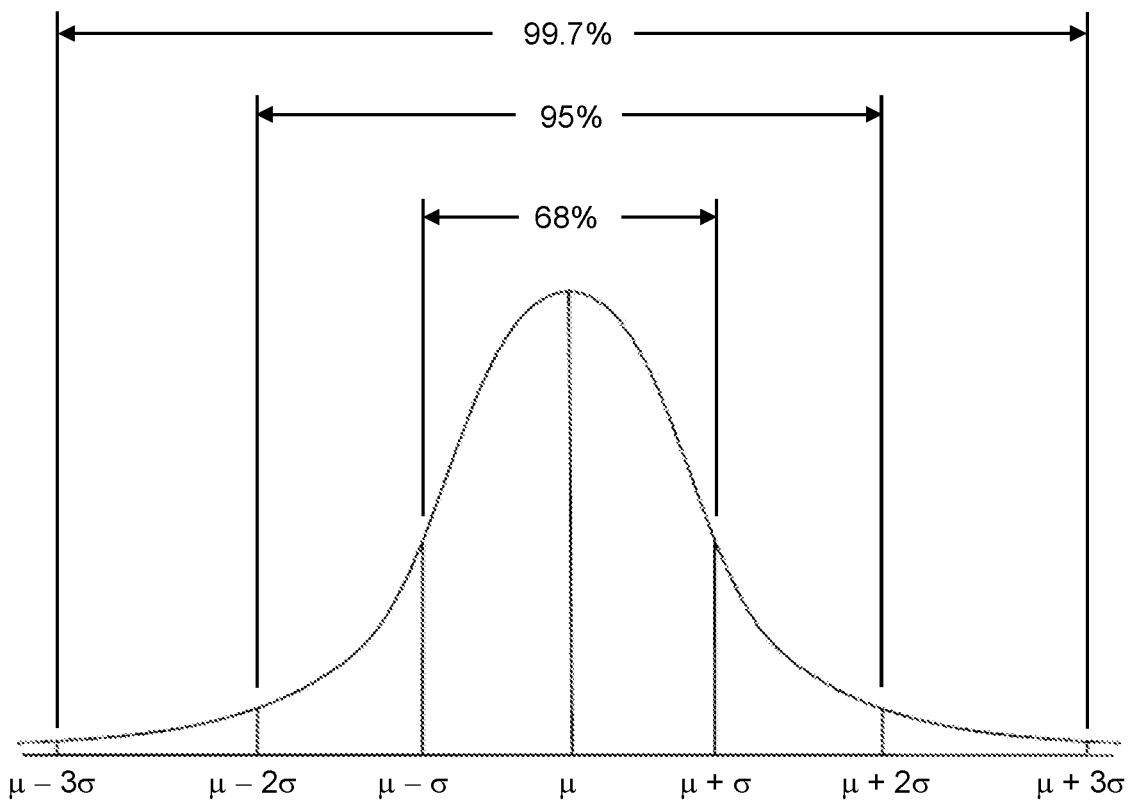
FIG. 3 shows the normal distribution showing the amount of variance within each standard deviation band, with the median µ representing the mean shape.

FIG. 3 illustrates the normal distribution showing the amount of variance within each standard deviation. The median line represents the mean shape. By selecting, for example, 10 models from −3σ to +3σ it is possible to design a product that will fit 99.7% of the population. If the raw data were used, however, it would be unclear which models to use and whether the chosen models were varied enough to cover the population. The following describes the methodology for generating an SSM that can be analyzed and used for product-fit analysis and machine learning algorithms. The following example relates to an SSM of the human body consisting of 6449 vertices. While low resolution models may be suitable in applications such as basic sizing studies or pose tracking in computer vision, for this embodiment, the goal is to utilize an SSM for product design, which requires a much higher density mesh which limits the available algorithms that can be used.

Figure 4:
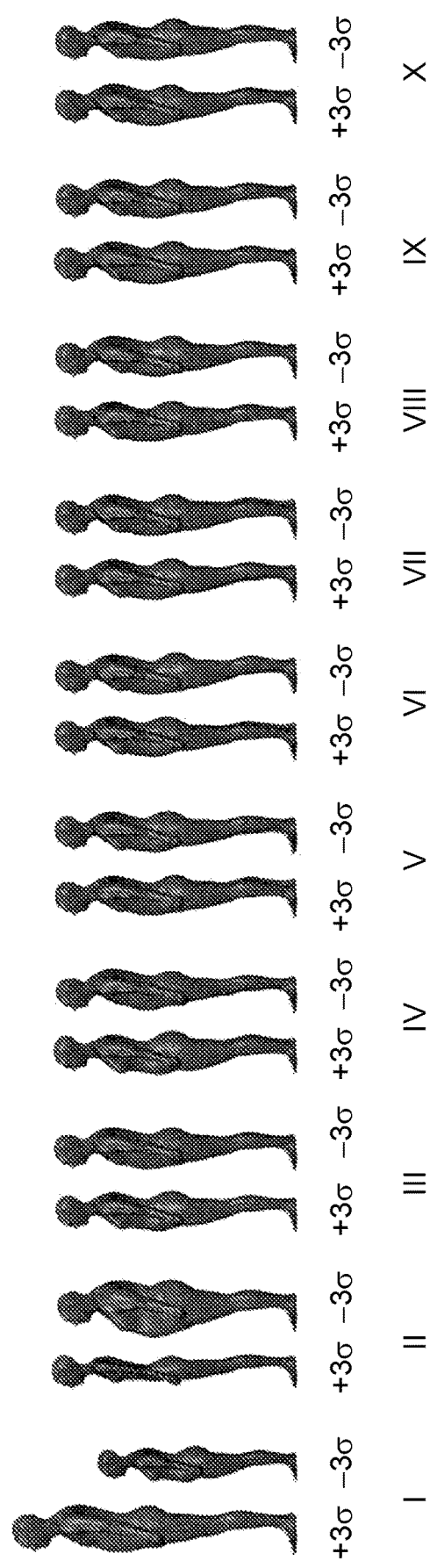
FIG. 4 shows views of a statistical shape model (SSM) of the human body, consisting of 6449 vertices, showing $-3\sigma$ and $+3\sigma$ and consecutive principal components from I to X.

FIG. 4 shows an SSM of the human body according to the background art, consisting of 6449 vertices. The SSM is constructed with −3σ and +3σ and the different models show 10 consecutive principal components (from I to X). From the model, the first three principal components constitute 90% of the total variance within the dataset and by using the first ten principal components the total explained variance is 97%. Principal component analysis (PCA) is a statistical procedure that uses an orthogonal transformation to convert a set of observations of possibly correlated variables into a set of values of linearly uncorrelated variables called principal components. The variables in this case are the positions of the corresponding vertices across each model. By performing PCA, as per FIG. 4, it is possible to construct a model of the variance within the given dataset. However, the outcome from the majority of available techniques is a relatively sparse model. What is shown in FIG. 4 are output models, where each is a polygon mesh representing the 3D shape, with each surface modelled as many small faceted surfaces (polygons) which connect adjacent points (vertices) using straight lines. The resolution of the model is dependent on the number of vertices and size of the scanned object. In FIG. 4, the output is a mesh with 6449 vertices, which is a very low resolution model that is unsuitable for studies in product design.

Figure 5:
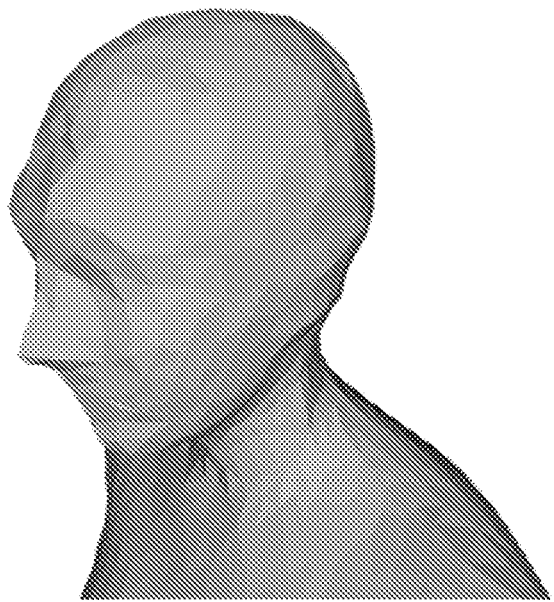
FIG. 5 according to this embodiment an statistical shape model (SSM) highlighting the ear region, showing that the output data is not sufficient to model the ear according to this embodiment.

FIG. 5 depicts an SSM highlighting the ear region, showing that the output data is not sufficient to model the ear. By focusing on the ear region in FIG. 5, detail is lost and unusable for this analysis. In order to be applicable to this example, the output data must have sufficiently high detail, meaning that each model in the 3D ear database should be used in full resolution or with minimal loss of quality. This creates a problem, as the majority of available algorithms are not suitable for high density meshes. Hence, the following criteria were employed in creating an SSM that is applicable to product design and machine learning.

Dense: a one-to-one correspondence: for each point in the mean shape there should be a corresponding point in each model. Typical approaches for an SSM rely on landmarks placed on the surface to guide the registration and fitting. However, the work required to train and detect landmarks limits the modularity of the approach. The difficulty with one-to-one correspondences is the increased complexity and overall computational resources required. The overall process for registering the 3D models is discussed below.

Non-Rigid: this refers to the ability of the method to account for large surface deformation in order to determine correct correspondences between points in different models. For models with pose variation or high deformation it is necessary to include non-rigidity. By analyzing the 3D ear database, non-rigidity was employed owing to the overall variation witnessed within the population for, in this example, the human ear. Contrary to applications for SSMs, such as bones or organs, the human ear is a complex surface with many folds and ridges, which create difficulties for rigid registration. Also, for other applications that have a high level of dynamic motion, such as the human hand, it is advantageous to incorporate non-rigidity at an early stage.

Groupwise: this parameter is beneficial to remove bias in the overall results. Groupwise refers to the process of generating the correspondences between points in different models and to generate the mean shape. Typically, this is a pairwise process where one model is chosen as the base, either the first model or a random model, and is then sequentially matched against the remaining models and the mean model is generated from the matching points, which creates a bias towards the chosen model. Groupwise registration aims to remove the bias by iteratively updating the mean shape by registering all of the models to a generic shape or chosen shape.

Non-Landmark Based: The majority of available statistical shape modelling algorithms rely on the use of landmarks, therefore, requiring a trained expert to train the detection algorithms and can actually be prone to errors or inaccuracies depending on the level of the expert. In this embodiment, it is not viable to manually landmark each model within the dataset as there is no access to an individual with this skill level and the requirement for landmarking is counter-productive to the overall goal of automating the construction of custom-fit products. By creating a system that does not require landmarks it allows for modularity and rapid adaptation to regions other than the ear.

In order to account for the large deformation between shapes, a shape matching process in the form of 'Functional Maps' is employed. As opposed to standard point-to-point matching, Functional Maps can be considered a 'transporter' that allows information to be moved across shapes. The main benefit of Functional Maps over point-to-point matching is that the mapping can be represented as matrices of linear transformations between basis functions on the shape.

Constructing a 3D statistical shape model (SSM) can be complex, as between consecutive 3D scans it may be uncertain whether a point that is in one model will be in the same position in the next model. For an SSM there needs to be a meaningful correspondence between points so, similar to a passive 3D reconstruction process, it takes the unordered point sets and finds the corresponding points across each model. According to this embodiment, an SSM is generated through the following process.

Pre-Processing of the Input 3D Models

As discussed above, the output of 3D scanner 12 is a high density 3D model of the target surface, in this example the human ear. However, the user has no control over the positioning or localized density of the vertex distributions. Thus, variations in vertex distributions and therefore discrepancies in vertex positions may exist between different 3D scans. As the SSM process is configured to generate a one-to-one correspondence between vertices, this discrepancy can result in poor registration. The method of this embodiment generates the SSM using the dense representation of the scanned object, but using the raw 3D scanning data results in poor registration. In order to alleviate the processing difficulty the 3D models are pre-processed to uniformly distribute the vertices and faces across the mesh while preserving the overall features, using the approach of Jakob et al. (*Instant field aligned meshes*, ACM Trans. Graph., 34(6):189, 2015), which produces a highly isotropic mesh while preserving sharp features.

The pre-processing of the input 3D mesh is split into 3 stages, calculation of the orientation field, the position field, and unification. The orientation field is a set of directions on the input 3D mesh to which the edges of the output mesh should align. The orientation field is constrained by measuring smoothness extrinsically, creating an automatic, parameter-free approach to determining 3D mesh orientation fields. The position field is the determination of a local, per-vertex $(u,v)$—parameterization where the integer values in this local parameterization correspond to the vertex locations of the final mesh. The gradient of the position field is exactly aligned with the previously computed orientation field. The two first steps are related in their minimization of a smoothness energy defined up to local symmetries: integer rotations in the case of the orientation field and integer translations for the position field. The purpose of determining the orientation and position field is to extract optimal vertex positions and connectivity information such that the output 3D mesh now exhibits a uniform distribution and face density. This is achieved by analysing the intersection of the orientation and position fields to determine vertex locations and the new connectivity information. The benefit of this is the simplification in the establishment in correspondences for highly varying 3D shapes such as the human ear. Through experimentation it was determined that relying on the raw vertex positions outputted from a 3D scanning system, the correspondences were suboptimal, resulting in multiple one-to-many correspondences where a vertex on one mesh is corresponded with multiple vertices on the target mesh. This is detrimental to the development of a SSM, as discussed previously, a SSM requires meaningful or semantic correspondences. The one-to-many correspondences results in a failure of the statistical shape modelling process. This is the main difficulty with generating a SSM using the full 3D scan data as opposed to a set of sparse 3D landmarks. By uniformly distributing the vertices and faces of the input 3D mesh it reduces the complexity of establishing the correspondences and also significantly reduces the possibility of a one-to-many correspondence.

SSM Generation

FIG. 6 is a simplified flow diagram 60 summarizing the method for generating the statistical shape model (SSM) according to this embodiment, involving pre-processing 62, groupwise registration 64 (in which all models are registered to the mean), statistical analysis 66 and variance analysis 68.

FIGS. 7A to 7D illustrate the effects of this process. FIG. 7A is a view of the original mesh, while FIGS. 7B to 7D are view respectively of the calculated orientation field, the position field, and the output mesh. It will be noted that the distribution of vertices over the surface is uniform, which assists the overall registration process. The original mesh consisted of 50,000 vertices, and the output consists of 16,000 vertices. There is no upper limit to the number of vertices in this SSM approach, but the higher the vertex count the longer the processing time will be. In this embodiment, the vertices are kept between 5,000-10,000 vertices, but in many practical applications the choice of upper limit should be determined based on visual quality. This means that the user should determine the appropriate number of vertices based on the loss of quality; in this example 5,000-10,000 vertices were selected as no visual loss of quality was seen.

Following the pre-processing stage, each of the input models must be registered to the mean shape. The mean shape can be iteratively refined from a random model in the dataset or a model can be selected that is close to the mean based on variance analysis. The selection of the mean shape is not overly critical to the output SSM, so a random shape is selected and the mean shape is refined. The registration process of this embodiment, that is the generating of point-to-point correspondences from functional maps, is depicted in flow diagram 80 of FIG. 8. Beginning with an input model or mesh 82, the process includes generating basis functions 84 by converting the input mesh to the basis functions, generating consistent functional maps 86, calculating rough correspondences 88 between the functional maps and the input mesh, and performing point-to-point refinement of the functional maps into consistent correspondences 88. The benefit of establishing point-to-point correspondences from functional maps 86, as opposed to standard 3D position, is that the process becomes relatively invariant to pose and deformation. This proved—during experimentation—to be advantageous for the human ear owing to its high degree of variability.

To calculate functional maps between shapes requires estimation of rough or soft correspondence across models, in this example between the selected model and a plurality of other pre-processed 3D models (for example the 3D models from the database). A first stage of development of the SSM through functional maps is to generate a rough or soft correspondence across all shapes in the dataset. This is used as an initial guess to guide the functional map generation.

This can be generated in multiple ways and is dependent on the complexity of the 3D shapes. For simple shapes a standard nearest neighbour approach where the 3D positions of the vertices within close spatial proximity are used to determine corresponding points. Alternatively, a feature description approach where each vertex on the 3D mesh is given a vectorial descriptor that aims to instill information about either its spatial location relative to the other vertices or its local complexity. Nearest neighbours are then employed to determine similar descriptors on the target shape. Nearest neighbours and feature description approaches can be associated with rigid based 3D shape matching where the input 3D shapes do not deform, this can be best visualized as man-made objects.

An alternative approach is to allow for non-rigidity in the 3D matching approach for more organic objects such as the human body which have a high degree of dynamic motion. Through trial and error, it was determined that to establish adequate initial correspondences for the human ear, non-rigidity must be included due to the high degree of shape variation in the human ear. To establish the initial correspondences a free form deformation approach with nearest neighbours is employed. It should be noted that certain feature description approaches can be considered to be non-rigid based on their use of isometry-invariant description approaches.

An embodiment of a free-form deformation approach uses 3D position of the vertices as matching information—where a 3D model is split into a volumetric grid and correspondences are established by deforming the grid to the closest point on a target shape. To establish correspondences using free-form deformation a coordinate grid is superimposed over the 3D mesh. For each vertex of the object, coordinates relative to this local grid are determined that register the vertex to the grid. Using these relative coordinates, each vertex can be mapped back to a modified grid which relocates that vertex in global space. Using this approach, it is possible to determine the parameters which map the source grid onto the target grid in a non-rigid manner. When the grid is aligned to the target shape a nearest neighbour approach is then used to determine the closest matching points. This can be seen to be similar to the rigid example, however, by non-rigidly deformating the source shape to the target before establishing the correspondences it allows for highly deformed shapes to be more accurately corresponded.

These initial correspondences are used as initial estimates in establishing functional map network that is used to generate the SSM. The functional map approach provides a framework for representing maps between shapes. Namely, given two shapes $S_i$ and $S_j$, a functional map $X_{ij}$: $L^2(S_i) \rightarrow L^2(S_j)$ is a map between spaces of integrable real-valued functions defined on the two shapes. The functional map framework is flexible because correspondences between points and parts are naturally encoded as correspondences between their indicator functions. It allows us to convert map computation into optimizing matrices and utilize rich numerical tools to solve the induced optimization problem.

Figure 9:
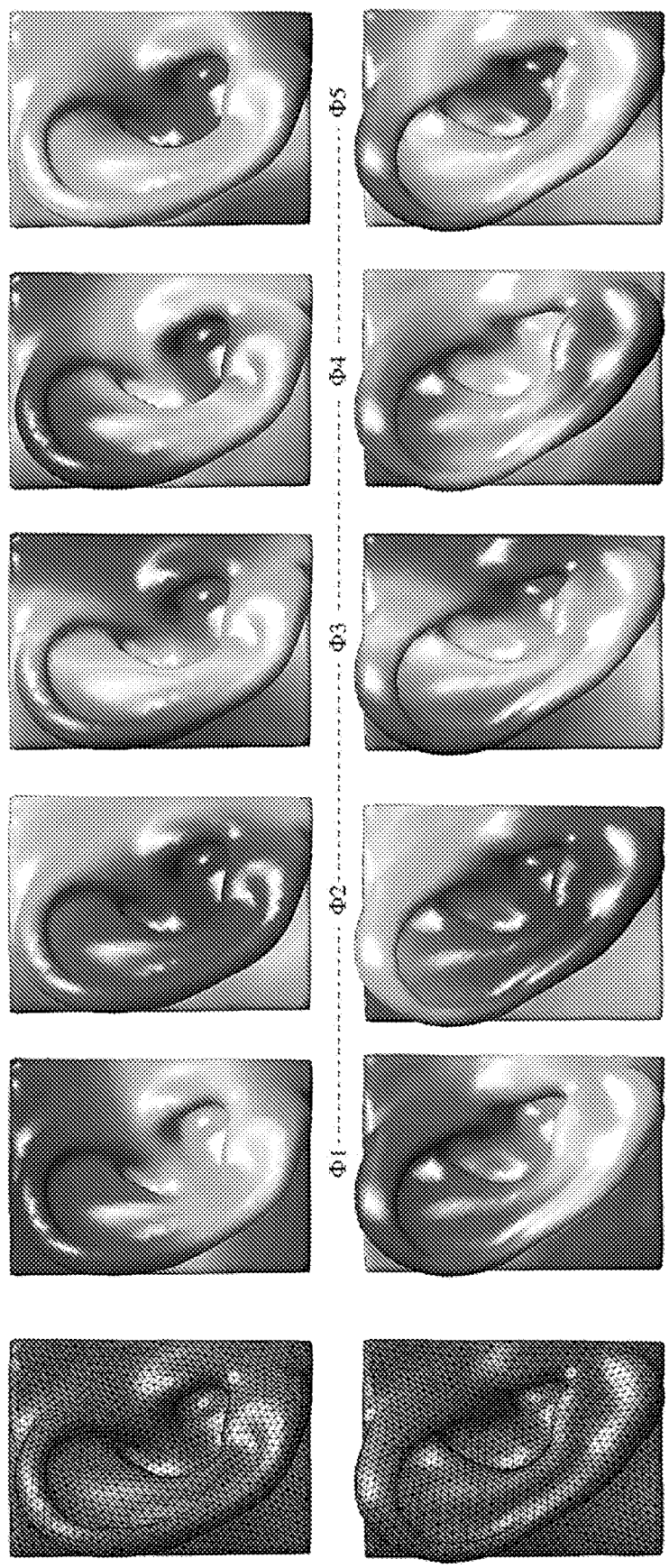
FIG. 9: Example of basis functions on the surface of two ears illustrating the similarities in certain basis functions.

To begin, to establish a functional map a rough correspondences (described above) and a reduced functional space is required. Reduced functional spaces are well characterized by their projections onto certain low-dimensional Laplacian eigenspaces. For the human ear, we follow the standard approach, and use the Laplace-Beltrami operator with up to 100 eigenvectors. The Laplace-Beltrami eigenbasis is highly relevant in non-rigid 3D shape matching due to its isometry invariance, this means that objects of the same shape in different poses will have the same Laplce-Beltrami eigenbasis. FIG. 9 shows the first five basis functions on the surface of two sample 3D models (of ears) illustrating the similarities in certain Laplace-Beltrami basis functions.

In this embodiment Laplace-Beltrami basis functions for 3D analysis are used. The Laplace-Beltrami basis exhibits preferable behaviour for 3D shape registration including deformation invariance, which means that regardless of the pose the basis functions will be the same. In an embodiment the discrete Laplace-Beltrami differential operator is described as; for a function $f$ defined on the surface, the value of $\Delta f$ is approximated as:

$$\Delta f(p_i) \approx \frac{1}{s_i} \Sigma_{j \in N(i)} \frac{\cot \alpha_{ij} + \cot \beta_{ij}}{2} [f(p_j) - f(p_i)] \quad \text{(Eq. 1)}$$

$$m_{ij} = \frac{\cot \alpha_{ij} + \cot \beta_{ij}}{2} \quad \text{(Eq. 2)}$$

$$L_{ij} = \begin{cases} \Sigma_k m_{ik}/s_i, & \text{if } i = j. \\ -m_{ij}/s_i, & \text{if } i \text{ and } j \text{ adjacent}. \\ 0, & \text{otherwise}/ \end{cases} \quad \text{(Eq. 3)}$$

The summation is over all vertices j adjacent with vertex $p_i$. Using the column vector $\vec{f}$, the formula in the above equation can be written as a matrix-vector multiplication $\Delta f \approx L\vec{f}$, where L is the discrete Laplacian in the above equation. Eigen decomposition of the discrete Laplacian L constitutes the Laplace-Beltrami basis functions.

Following the decomposition of the collection of shapes into their laplace-beltrami eigenbasis and the establishment of the rough correspondences, the functional map correspondences can be found. The input correspondences are treated as noisy measurements of the entries to the functional map matrix X, and therefore compute X by recovering a low-rank matrix. This robust formulation enables the recovery of X from mostly inliers in the input correspondences and thus the resulting X is close to factorization, the formulation of the convex program to compute the map matrix is below:

$$X^* = \underset{x}{\operatorname{argmin}} \|X\|_* + \lambda \sum_{(i,j)} \|X_{ij}C_{ij} - D_{ij}\|_{2,1} \quad \text{(Eq. 4)}$$

The objective function essentially consists of two types of matrix norms. The first component is called the trace-norm defined as $\|X\|_* = \Sigma_i \sigma_i(X)$ where $\sigma_i(X)$ are singular values of X. The second component uses the $L_{2,1}$ norm i.e. $\|A\|_{2,1} = \Sigma_i \|a_i\|$ where $a_i$ are columns of matrix A. This $L_{2,1}$ norm prioritizes the face that the optimal value of X is insensitive to outlier correspondences. For optimization, the alternating direction method of multipliers (ADMM) is employed.

Simply generating a functional map network between a collection of shapes does not allow for a SSM to be constructed. Once the models are completely registered it can be said that there is now a one-to-one or meaningful correspondence across each model in the dataset. What has been achieved in the above description for SSM generation is that, for each vertex on the mean shape, its position across each shape in the dataset has been recovered. From this it is possible to establish the average shape in the dataset by simply taking the mean. The variation within the dataset can also be determined using principal component analysis (PCA). The mean shape is an extremely important component of the SSM and is very useful in terms of product design.

Principal component analysis (PCA) models the variation in a set of variables in terms of a smaller number of independent linear combinations (principal components) of those variables, in this case the variables are the position of the corresponding points. Principal components refer to the directions where there is the most variance, i.e. the directions where the data is more spread out. The outputs of PCA are the eigenvectors and eigenvalues; an eigenvector is a principal component and an eigenvalue denotes the variance in the data in that principal component.

By taking the corresponding vertices across the models and processing them through PCA, the output will be the principal components and the eigenvalues which illustrate the variation within the dataset. Each principal component can be assigned a proportion of the variation within the dataset and can therefore be used to reduce the dimensionality. For example, if the first three out of thirty principal components constitute 96% of the total variation, then the model may be simplified or approximated by ignoring the remaining 27 components. By per-forming PCA, it is possible to reconstruct a set of data within a predefined standard deviation, where S is the shape, $\varepsilon_{val}$ and $\varepsilon_{vec}$ are the eigenvalues and eigenvectors respectively, and $\sigma$ is the standard deviation.

$$S_{new} = S_{mean} + \sigma \times \sqrt{\varepsilon_{val}} \times \varepsilon_{vec} \quad \text{(Eq. 5)}$$

It is desirable to analyze the variation in a dataset between a certain range of deviations, such as between $\pm 3\sigma$. For example, referring to FIG. 3, by selecting $\pm 3\sigma$, a variance of 99.7% of the dataset will be covered. By varying the standard deviation it is possible to construct any number of 3D ears, however, the accuracy of which is dependent on the size, quality, and variability of the dataset. By constructing a SSM and analyzing the data in the desired standard deviation range it is possible to design a product that can be a one-size-fits-most or to develop automation algorithms for custom-fit.

Figure 10:
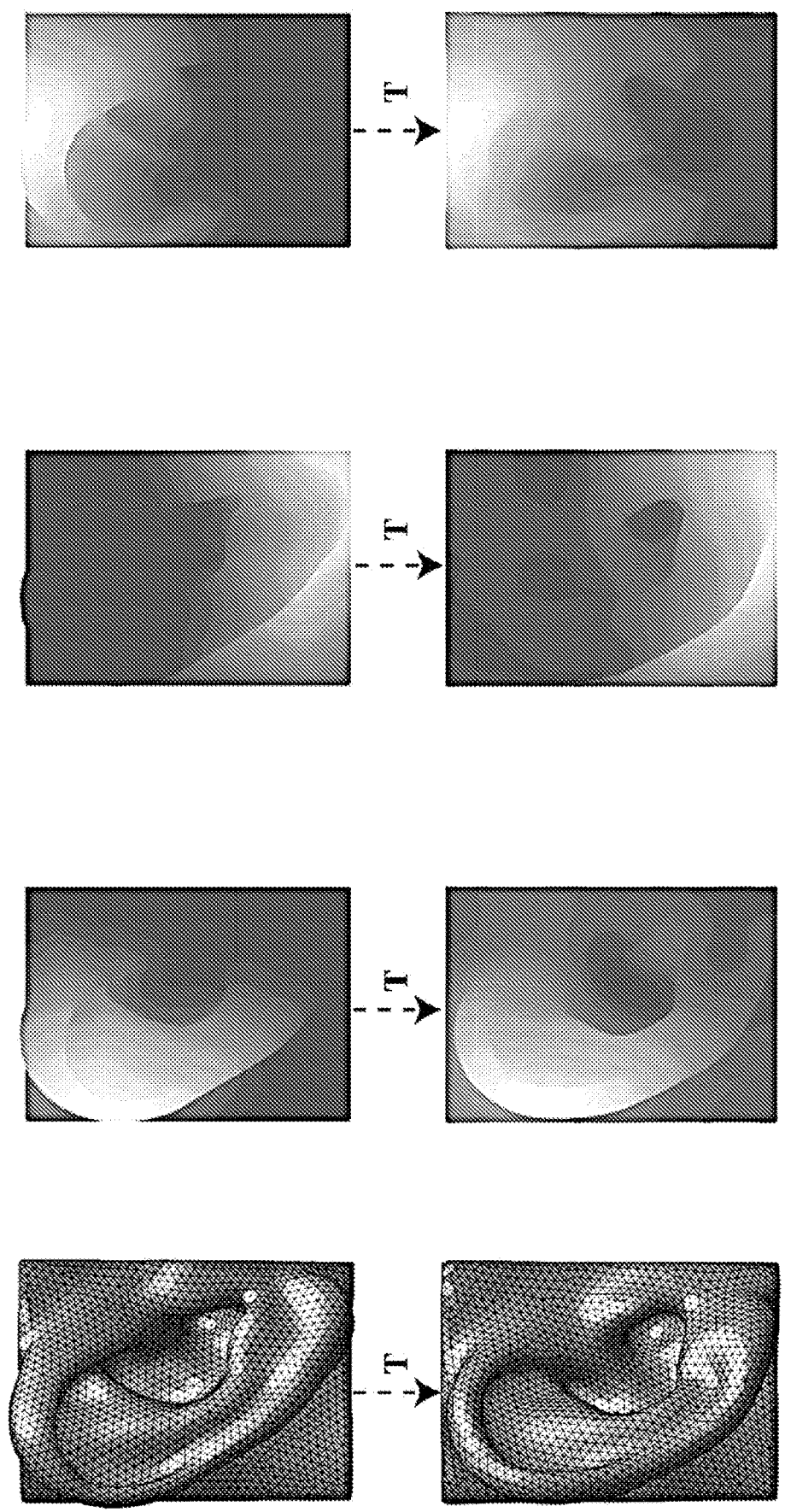
FIG. 10 shows the process of transferring a function on the source shape to the target using a calculated functional map according to this embodiment.

FIG. 10 shows the process of transferring a function on the source shape to the target using a calculated functional map according to this embodiment. As can be seen in this figure, by using the functional maps calculated between shapes it is possible to transfer functions on the surface of the source shape (upper register) to the target (lower register). Using the process by Huang et al. (2014), the functional maps are jointly optimized which instills consistency in the registration process.

The input 3D models have then been processed to have a functional map between the mean shape and all other shapes. From FIG. 10 it can be seen that this allows the transfer of functions on the surface of the model to any shape in the dataset. However, this is not particularly useful for SSM. Rustamov et al. (*Map-based exploration of intrinsic shape differences and variability*, ACM Transactions on Graphics (TOG), 32(4):72, 2013) has shown that by using collections of functional maps one can visualize intrinsic variances, but for SSM it is necessary to physically deform the mean shape in order to generate a new shape. Therefore, in order for the functional map network to be usable with a SSM, it is necessary to refine the functional maps into a point-to-point correspondence. Following the process by Rodolà et al. (*Point-wise map recovery and refinement from functional correspondence*, arXiv preprint arXiv:1506.05603, 2015), the coherent point drift (CPD) (Myronenko et al., 2007) algorithm is utilized to generate a point-to-point correspondence which can be used with a SSM. However, this process generates a one-to-many mapping which is not ideal for a SSM, this means that for a vertex on the mean shape there is more than one matching point on the target surface. If the position of the corresponding vertices on the target surface are taken then this creates inverted faces which are not desirable in a SSM. Hence, the positions of the corresponding vertices are used as an initial guess position and the mean shape is deformed to the target shape using regularized non-rigid mesh deformation which prevents erroneous matches from affecting the end result. This can be seen to alleviate the problem of inverted faces and one-to-many correspondences, while maintaining the advantage of the accurate matches from the functional map approach.

Figure 11D:
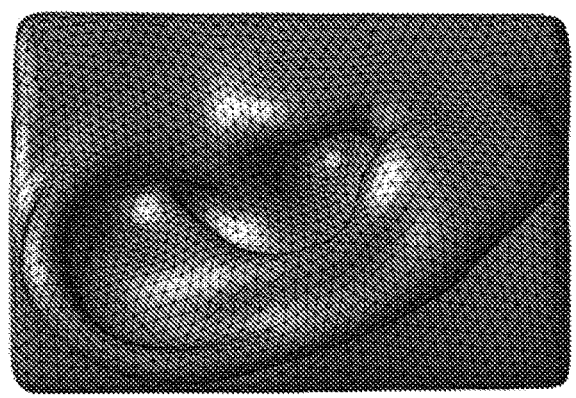
FIGS. 11A to 11D illustrate consistent point-to-point refinement, showing respectively the source, the target, CPD refinement and according to the present embodiment using regularized non-rigid mesh deformation.
Figure 11C:
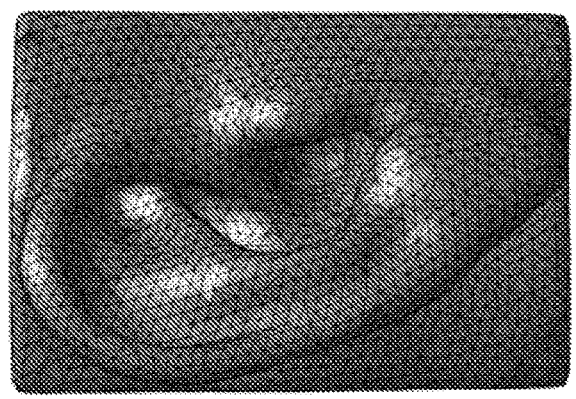
Figure 11B:
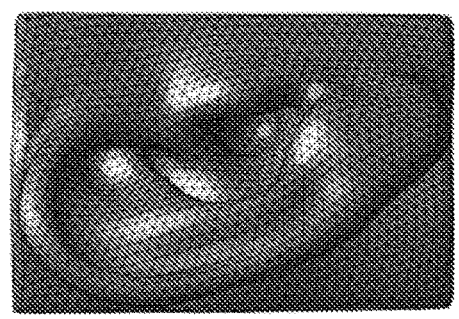
Figure 11A:
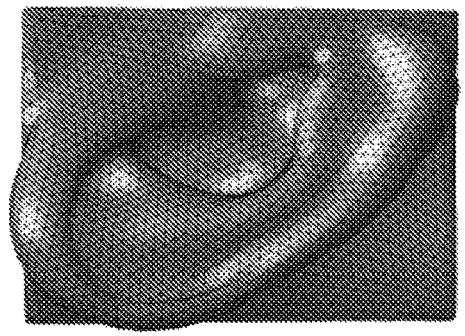

FIGS. 11A to 11D illustrate consistent point-to-point refinement, and are respectively the source (FIG. 11A), the target (FIG. 11B), output model after conventional CPD refinement (FIG. 11C) and output model according to the present embodiment using regularized non-rigid mesh deformation (FIG. 11D). As can be seen in FIGS. 11A to 11D, rather than taking the position of the target vertices as the final position, by deforming the source shape it creates a much more uniform face distribution. Using CPD alone is not sufficient owing to, not only the high density of the point set, but also the large deformation between consecutive shapes of the ear.

Figures 12A, 12B, 12C:
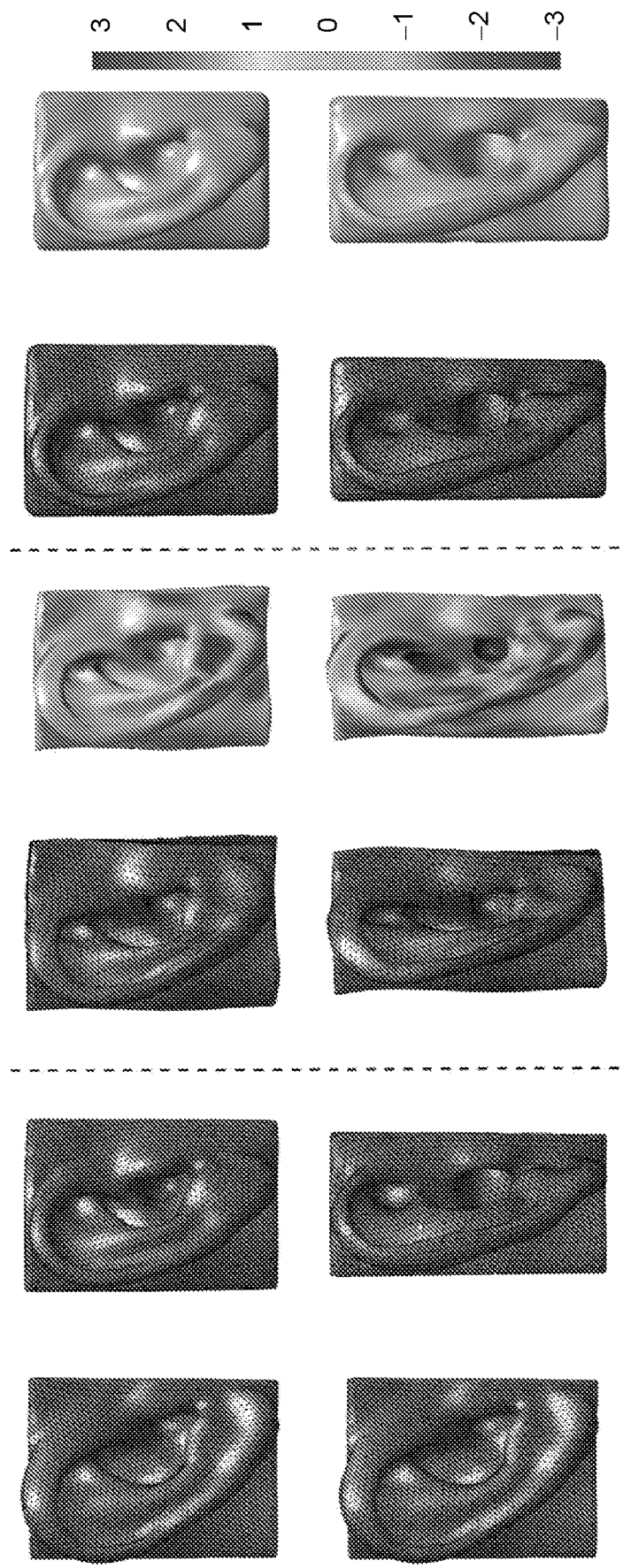
FIGS. 12A to 12C are views of the registration error of the standard coherent point drift algorithm on the raw point data versus the refined correspondences using the functional maps.

To illustrate how much the functional map process accounts for shape deformation a comparison between CPD and Functional Maps is given in FIGS. 12A to 12C. FIGS. 12A to 12C illustrate the registration error of the standard coherent point drift algorithm on the raw point data versus the refined correspondences using the functional maps; these figures show, respectively, FIG. 12A the source models (sources in left register; targets in right register), FIG. 12B coherent point drift (results in left register; errors in right register) and FIG. 12C functional maps (results in left register; errors in right register). The error scale is between −3 mm and +3 mm.

As can be seen from the discolouration, indicating correspondence errors after CPD, on the error image (right) of FIG. 12B, using CPD alone it is not possible to deform the source shape to match the target, this could be due to the high density of the point set or the large deformation. CPD aims to physically deform the source point set whilst taking account of the overall structure, but there is a limit to how much the shape can deform and in the case of the human ear, the algorithm fails. However, in medical applications such as human organs or bones where there is not a high level of curvature or features, the CPD algorithm could perform better.

Once the models are completely registered it can be said that there is now a one-to-one or meaningful correspondence across each model in the dataset. What has been achieved in the previous sections is that, for each vertex on the mean shape, its position across each shape in the dataset has been recovered. From this it is possible to establish the average shape in the dataset by simply taking the mean. The mean shape is an extremely important component of the SSM and is very useful in terms of product design. Principal component analysis (PCA) models the variation in a set of variables in terms of a smaller number of independent linear combinations (principal components) of those variables, in this case the variables are the position of the corresponding points. Principal components refer to the directions where there is the most variance, the directions where the data is more spread out. The output of PCA are the eigenvectors and eigenvalues, an eigenvector is a principal component and an eigenvalue denotes how much variance there is in the data in that principal component.

By taking the correspondences across the models and processing them through PCA, the output will be the principal components and the eigenvalues which illustrate the variation within the dataset. Each principal component corresponds to a proportion of the variation within the dataset and can be used to reduce the dimensionality, for example, if the first three out of thirty principal components constitute 96% of the total variation then it can be deemed unnecessary to include the remaining 27 components. By performing PCA, it is possible to reconstruct a set of data within a predefined standard deviation, as follows:

$$\text{NewShape} = \text{Mean} + \sigma\sqrt{\text{Eigenvalues}} + \text{Eigenvectors}, \quad \text{(Eq. 5)}$$

where $\sigma$ is the standard deviation that is used to scale the data to the desired range. For this embodiment, it is desirable to analyze the variation in a dataset between a certain range of deviations, such as between $-3\sigma$ and $+3\sigma$. As per FIG. 3, by selecting $-3\sigma$ and $+3\sigma$ a variance of 99.7% of the dataset is covered. By varying the standard deviation it is possible to construct any number of 3D ears; however, its accuracy is dependent on the size, quality, and variability of the dataset. This is desirable as the goal is to automate how custom-fit products are designed using SSMs. By constructing an SSM and reconstructing the data between the desired standard deviation, it is possible to design a product that can be a one-size-fits-most or to develop automation algorithms.

By performing the process outlined by reference to FIG. 6, an SSM of the human ear is constructed, as described above. In order to construct the SSM each model is registered to the mean shape using the functional map process discussed previously, this creates a set of 3D meshes whose vertices are in correspondence. This means that each vertex on the source shape has a meaningful correspondence with every shape in the dataset. With all of the shapes in correspondence it is now possible to use this to generate some statistical information. For this the principal component analysis (PCA) method is used. PCA is a statistical procedure that uses an orthogonal transformation to convert a set of observations of possibly correlated variables into a set of values of linearly uncorrelated variables called principal components. PCA is mathematically defined as an orthogonal linear transformation that transforms the data to a new coordinate system such that the greatest variance by some projection of the data comes to lie on the first coordinate (called the first principal component), the second greatest variance on the second coordinate, and so on.

PCA, when performed on the dataset of 3D shapes, produces the eigenvectors and eigenvalues that can be used to reconstruct any shape within the normal distribution. Using PCA there are two ways to reconstruct the data, selecting the mode of variation and selecting the desired level of variance.

Figure 13:
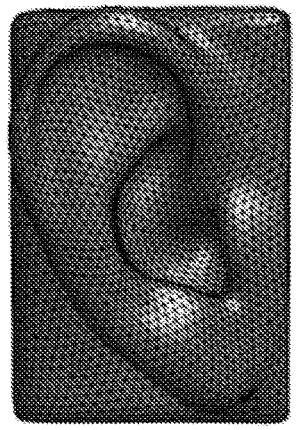
FIG. 13 is a view of a statistical shape model (SSM) of the human ear showing the individual modes of variation between $-2\sigma$ and $+2\sigma$.
Figure 13:
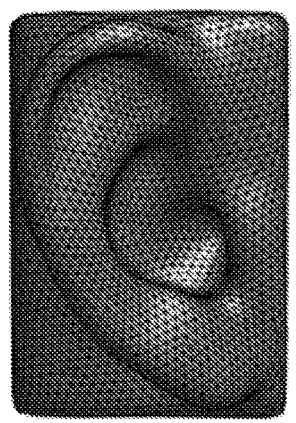
Figure 13:
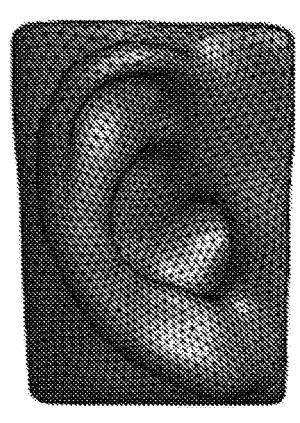
Figure 13:
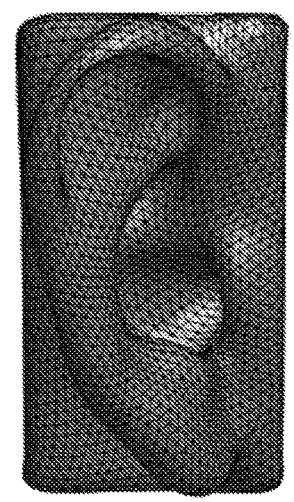
Figure 13:
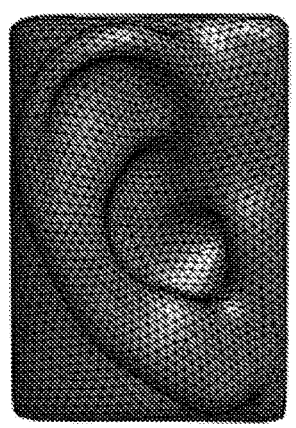
Figure 13:
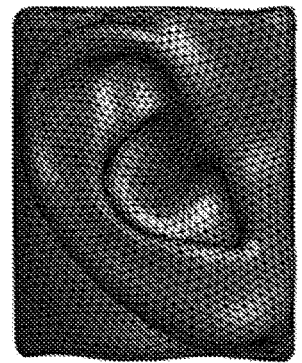
Figure 13:
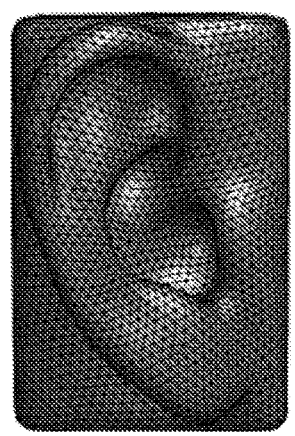
Figure 13:
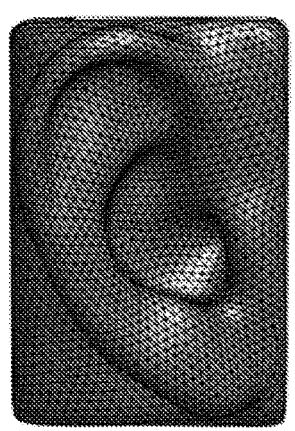
Figure 13:
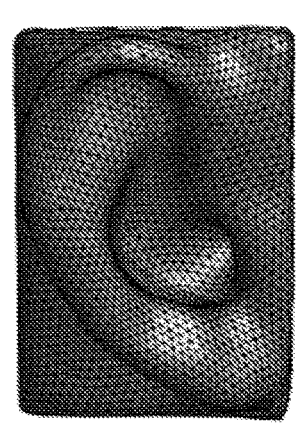
Figure 14:
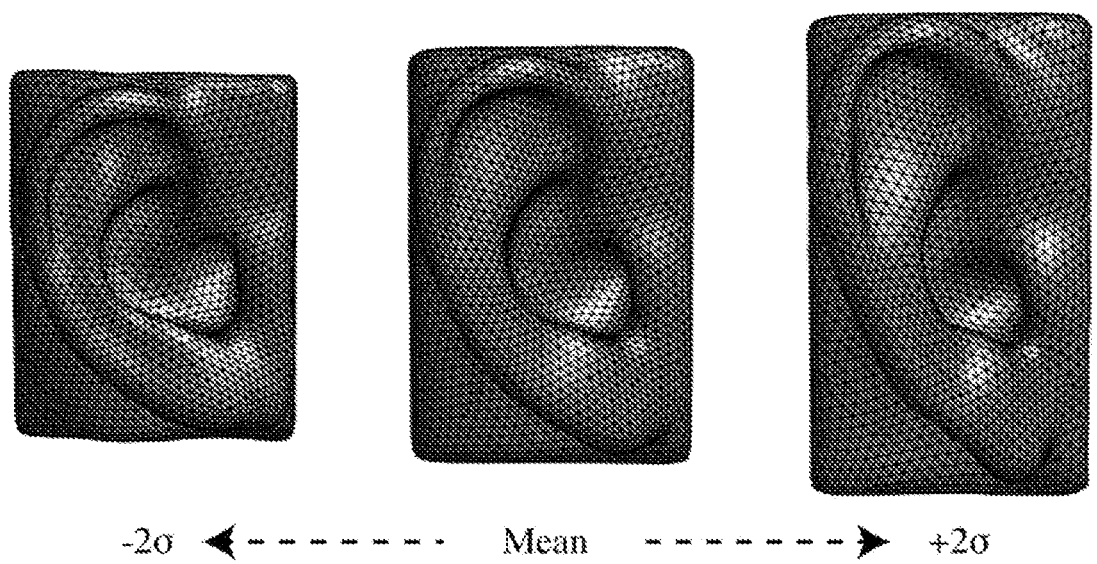
FIG. 14 shows how the present embodiments accounts for 95% of the variation within the dataset between $-2\sigma$ and $+2\sigma$.

By processing the data it can be seen that the first principal component accounts for 57% of the variation in the dataset, the second principal component accounts for 18% and the third component takes just 5%, cumulatively amounting to 57%, 75% and 80%. To account for 97% of the variation, the first twelve principal components would be required. FIG. 13 shows the SSM of the human ear showing three individual modes of variation (a first mode in the top register, a second mode in the middle register and a third mode in the bottom register) between $-2\sigma$ and $+2\sigma$. However, the principal components can also be summed so as to account for a set level of variance. FIG. 14 shows the $-2\sigma$ and $+2\sigma$ accounting for 95% of the total variance. In comparison with FIG. 13, the shapes of the model in FIG. 14 account for scale and shape changes in the ear.

The SSM consists of 5000 points and 10,000 faces, but the method of this embodiment is relatively invariant to the density of the pointset, the only disadvantage being the increased computational cost.

Figure 15:
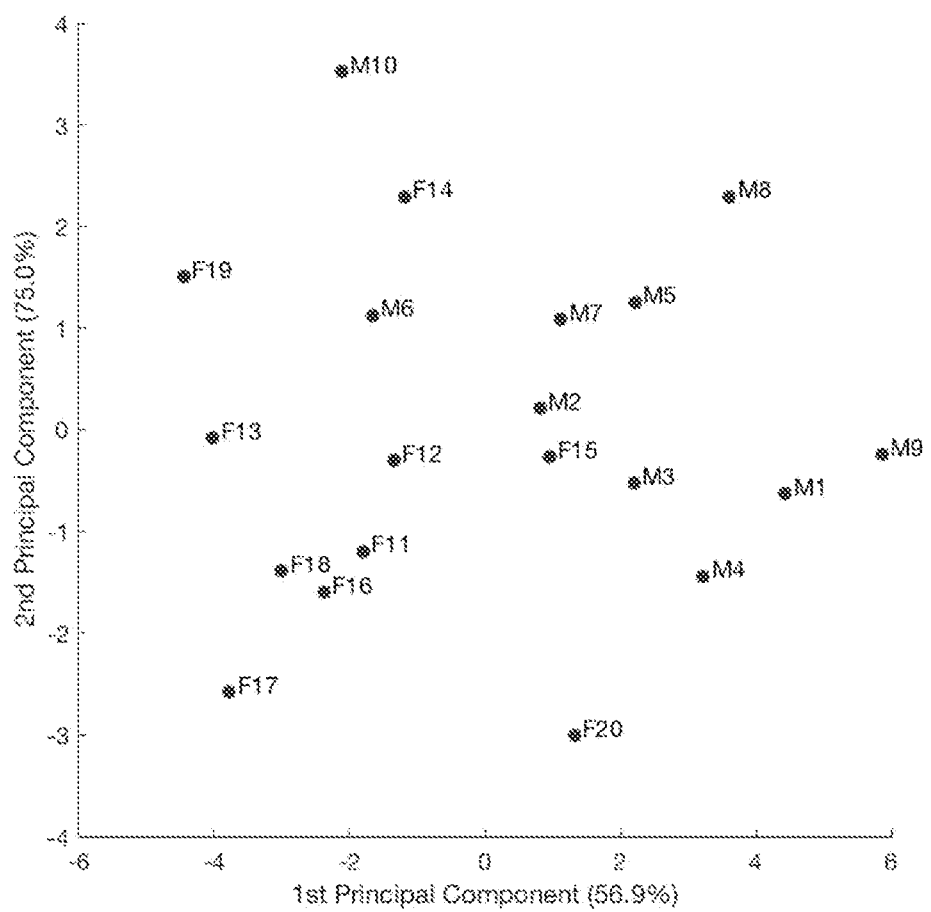
FIG. 15 is a view of the distribution of the variation within the dataset showing a clear distinction between men and women, in which the x-axis is the first principal component and the y-axis is the second principal component.

An interesting application of the SSM is the analysis of distribution of variance. It can be seen that there is a clear separation between male and female ears, which shows that—by generating a high resolution 3D database of ears—it should be possible to determine, to at least some degree of reliability, whether a person is male or female based on their 3D ear profile. FIG. 15 shows an exemplary distribution of male and female ears that could be used to construct a sex classifier based on this result.

The SSM generated by SSM generator 30 provides the ability, via variance analyzer 40, to analyze the variance within the dataset. In existing approaches, variance is measured in 2D through the use of anatomical landmarks, and variance is then used by designers through a mathematical table that establishes the planar variation between landmarks. However, using the 3D dataset it is possible—according to this embodiment—to establish a more visual variation that is analogous with the 3D computer design approach to product design. Variance analyzer 40 takes the mean shape established as described above and generates a visualization of a scalar field on the surface of the shape that is representative of the distance between the mean shape and the selected standard deviation. The colour fields are signed distances measured in millimetres.

Figure 16:
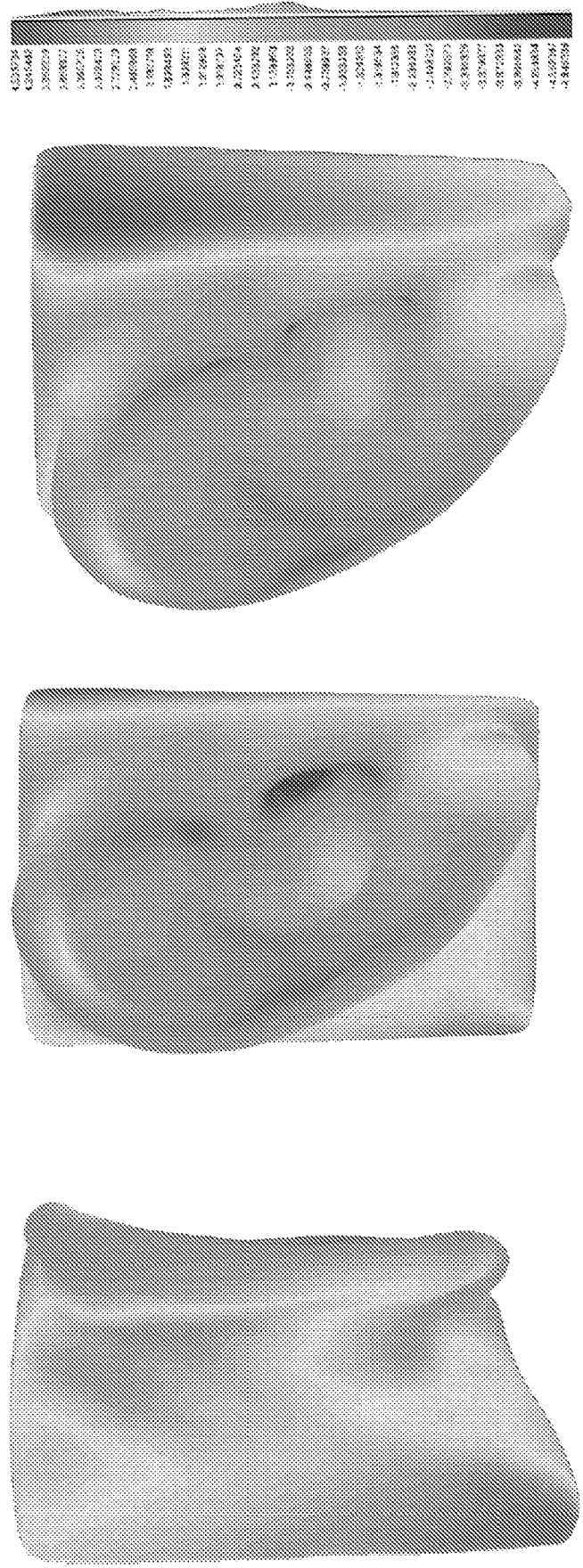
FIG. 16 shows the distance (mm) from the mean shape to the $+2\sigma$ visualised as a scalar field on the mean shape.
Figure 17:
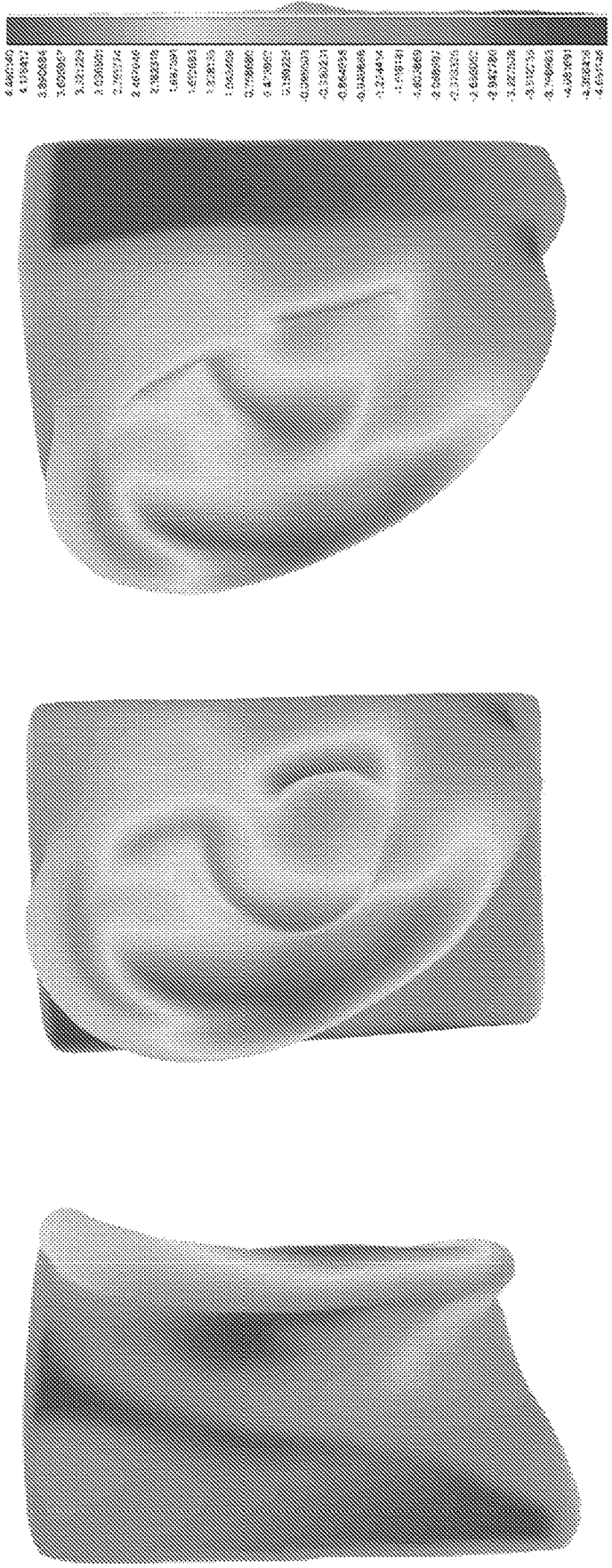
FIG. 17 is a view of distance (mm) from the mean shape to the $-2\sigma$ of the second principal component visualised as a scalar field according to this embodiment.

FIG. 16 shows the distribution of distances (mm) on the surface of the mean shape, from the mean shape to the $+2\sigma$ visualised by variance analyzer 40 as a scalar field on the mean shape. As can be seen, these distances are representative of the distance from the mean shape to the right model in FIG. 14 in the range of about $-4$ mm and $4$ mm. (The scale on the right of this figure extends from $-4.85$ to $4.54$ mm.) In the inner ear region the difference is relatively uniform aside from the entrance to the ear canal which exhibits a large deformation. By performing the same analysis using −2σ in FIG. 14, the scalar field shown in FIG. 17 is established. Comparatively speaking, FIG. 17 contains the majority of variation in the inner ear region, as opposed to the uniform deformation in FIG. 16, which constitutes primarily an increase in scale. (The scale on the right of FIG. 17 extends from −4.65 to 4.46 mm.)

An SSM can thus be generated by SSM generator 30 that non-rigidly determines a groupwise, dense correspondence without relying on landmarks. The SSM process that was created is invariant to pose and deformation, due to the use of functional maps, and using the pre-processing steps outlined previously the process is robust to large point densities. The SSM can be generated automatically by SSM generator 30.

FIG. 12 shows a comparison between the functional map framework used in this embodiment to the standard point-to-point matching using coherent point drift (CPD) showing the clear advantage of functional maps. In terms of quantitative analysis, the geometric re-construction error can be seen in FIG. 12 and for the functional maps the error is relatively even between −0.5 mm and +0.5 mm. The chosen SSM process has valuable properties which are not seen in any other SSM process including invariance to pose, large deformations, and high density point sets. The joint optimization of the functional maps also establishes consistency in the registration process.

The SSM of the human ear can be seen from FIGS. 13 and 14. Overall the quality is very high and is on par with that according to the background art (cf. FIG. 4). The SSM of the human body consists of 6449 vertices in total but, for the human ear SSM constructed according to this embodiment, the density is 5000 points and contains considerably more detail than the available model. The SSM construction process is invariant to the density of the input point set, this means that the algorithm will be able to process a dataset of high density with similar quality, the only disadvantage is the increase in processing time. However, it should be noted that the processing of the SSM only needs to be performed once and is then applied to each input 3D scan.

Using the functional map algorithms, the natural deformations of the human ear are taken into account; from FIG. 12 it can be seen that when compared with standard point-to-point CPD, the functional map registration of this embodiment is able to generate a near exact match for models with large surface deformation. The colour-maps represent the distance between the deformed source shape and the target shape. As can be seen CPD fails to converge to the target shape which can be seen through the large colour variation on the surface in the range of −3 mm to +3 mm. Using the same scale it can be seen that the functional map based registration recovers the target shape with a relatively uniform surface registration error. The following describes further examples of the registration accuracy of the functional map framework.

By analyzing FIG. 15, the distribution of the variation within the dataset can be seen. There is a clear distinction between men and women, something that was not clearly evident through visual analysis of the dataset. Therefore, using the high quality 3D SSM as the basis of a classification framework it may be possible to determine the sex and possibly age of an individual from an image or 3D scan, which has applications in biometrics. From FIGS. 16 and 17 the distance between the mean shape and the −2σ and +2σ can be visualized on the surface of the mean shape as a scalar field. It discussed previously, by utilizing a 3D SSM it is possible to overcome the limitations of 2D landmarking and anthropometrics by visualizing variance in a way that is synonymous with the way in which designers work. By utilizing metric colour maps the user can visualize and study variation in a new dimension as opposed to planar 2D dimensions that were used previously. By using 3D scanner 12 and SSM generator 30, it is possible to remove the complexity in generating SSMs and make 3D anthropometrics viable for industries or designers to inform the way in which they design products. As can be seen, +2σ constitutes primarily a scale increase from the mean shape with minimal area distortion, while −2σ contains the majority of the inner ear variation.

FIGS. 7A to 7D illustrate the pre-processing of an input mesh showing the uniform distribution of vertices and faces while maintaining the overall features; FIGS. 7A to 7D are respectively the original mesh, the orientation field, the position field, and the uniform output mesh. The necessity to pre-process the input data in FIGS. 7A to 7D could be inferred as a limitation due to the necessity to alter the input data. However, by distributing the faces and vertices on the surface it improves the overall registration process while maintaining the surface features. The reduction in point density also improves the overall computational time by removing redundant information. For a large database the processing time can be significant, however, due to the iterative nature of the correspondence refinement procedure there is no alternative. By utilizing parallel processing the construction time can be reduced, but there is a limit of parallel processes depending on the computational resources. Even though the processing time is very high it only needs to be performed once. Subsequent use of the SSM does not require registration and can be performed in near real-time.

The SSM is thus used as a prediction of the overall shape of the product, in this example an in-ear device. The SSM encompasses the variation of the given population, therefore, given a new shape it is possible to predict where in the normal distribution that test shape lies, which is the foundation of morphable models (Bustard and Nixon, *3d morphable model construction for robust ear and face recognition*, Computer Vision and Pattern Recognition (CVPR), 2010 IEEE Conference on, pages 2582-2589. IEEE, 2010). By registering an in-ear device to the SSM and then using a morphable model framework it is possible to predict the customized shape of the input device. Also, by establishing the constraints on the CAD design it is possible to generate automatically functional products from 3D scan data.

One of the disadvantages of the SSM is the necessity to register all of the data to the mean. If a new model is added to the dataset it would be required to re-process the entire dataset which is a time consuming task.

The process for deforming the 3D CAD model of a fitting to allow automated manufacturing of the customized product, such as in-ear devices (earphones, hearing aids, earplugs and the like), is described in greater detail as follows.

Deformation Guides in CAD Designs to Streamline the Automation Process

Figure 18:
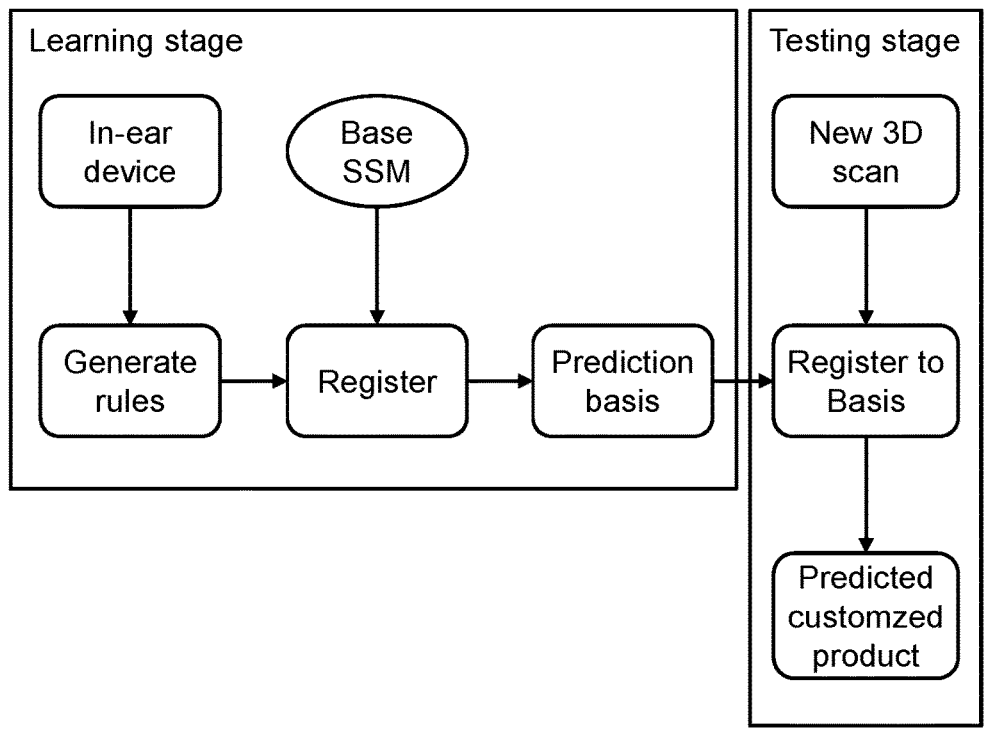
FIG. 18 is a flow diagram illustrating the method of this embodiment, showing the use of a constructed SSM as the base for a prediction framework of the customized shape.

FIG. 18 is a flow diagram illustrating the method of this embodiment, showing the use of a constructed SSM as the base for a prediction framework of the customized shape. According to this method, a CAD part is digitally deformed relative to the change in shape of the statistical shape model (SSM). This means, when a new 3D scan is registered to the SSM, it generates a deformation field which is transferred to the product; using this deformation field as a guide the CAD product is deformed. Thus, constrained 3D mesh deformation techniques are used, guided by the change in shape from the SSM to the input 3D scan. By incorporating 3D mesh deformation techniques, a user may control how a product is deformed such that selected regions (e.g. functional or critical regions) in the CAD product can be preserved. As a result, the method of this embodiment begins with the final product and applies deformation guides such that the shape can be customized or adapted to, for example, an individual's 3D scan.

In this context, it is important to differentiate between a rule and a guide. A rule contains a set of routines that are to be performed dependent on the situation and are typically in the form of an if-then-else statement. Using this approach with an expert system it is possible to account for a multitude of potential designs using these statements, but there is a significant amount of work and resources required to add new product designs to this approach. Owing to the highly varying and often individualized hearing-aid industry it is important to have rapid adaptation of product designs. Rule based methods, while widespread, are typically replicative processes in which the goal is to completely replicate the actions performed by a trained expert. This means that each individual raw 3D scan is processed step-by-step into the functional product using a set of rules. Rule based systems rely on the detection of landmarks on the surface of the 3D scan, which are used to align certain procedures such as cutting or forming but can lead to inaccuracies and rely on the individual having a deep understanding of the anatomy of the area that they are designing for. This embodiment circumvents the necessity to process the raw scan by reversing the process. As may be seen in FIG. 18, the method of this embodiment begins with the 3D product design constructed from the mean shape of the SSM or a generic shape, which is then deformed to fit the 3D scan data, without the detection of landmarks or creation of if-then-else statements.

With this framework, the only extra information other than the SSM and the 3D product design are the guides for how the shape can deform to match the 3D scan data. In order to maintain functionality of the product design, these guides determine the rigidity and final positioning of the final customized mesh elements.

Figure 19A:
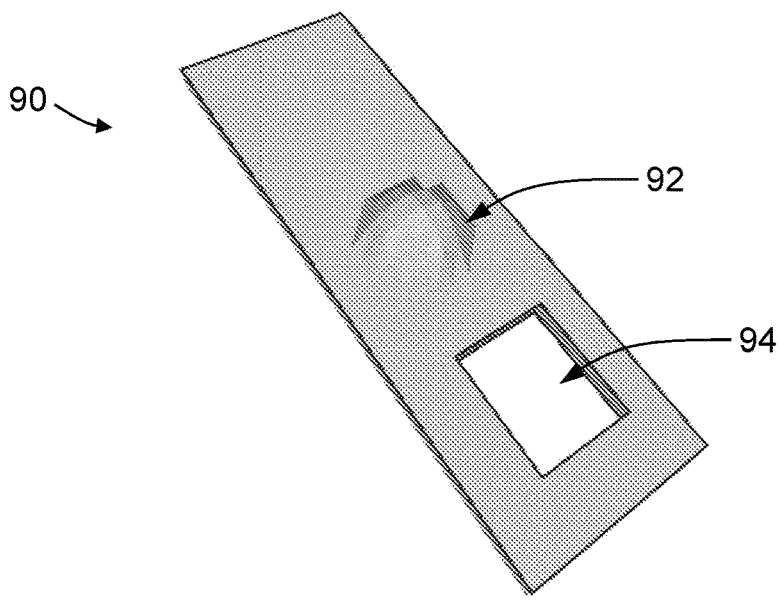
FIGS. 19A and 19B depict a sample 3D mesh to test the mesh deformation process of this embodiment, having a bump to preserve local rotations and a rectangular cavity to preserve form.
Figure 19B:
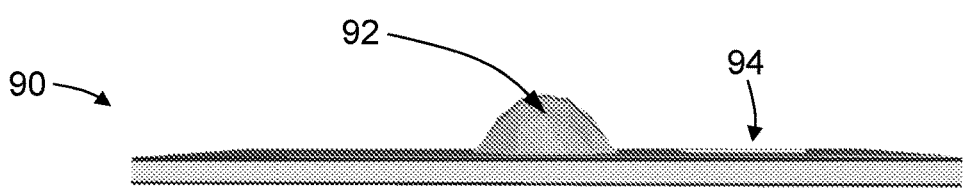

FIGS. 19A and 19B depict a sample 3D mesh 90 to test the mesh deformation process of this embodiment. Sample 3D mesh 90 includes a bump 92 and a rectangular cavity 94. Mesh 90 of FIGS. 19A and 19B was designed without edges such that there is no internal volume. Bump 92 was included to show how the process can preserve the normal to the surface and hence local rotations, and cavity 94 to show how the form can be preserved.

An advantageous element of this embodiment is the process by which a deformation technique is used to fit the CAD design to a new 3D scan. This embodiment employs an As-Constrained-As-Possible (ACAP) 3D mesh deformation process that allows for realistic and local rotation preserving deformations whilst preserving user-selected important features. ACAP 3D mesh deformation is built-off of the process by Masuda et al. (*Preserving form features in interactive mesh deformation*, Computer-Aided Design, 39(5):361-368, 2007) where they employ a constrained Laplacian system to deform a 3D mesh while preserving user-defined features. In their interactive approach, the user defines a local axes-angle transformation to a vertex which is then interpolated over the mesh and the final positions are determined by solving the constrained Laplacian system. The difficulty with this approach is determining the local transformation of each vertex relative to the user-input as it requires an axes-angle transformation and for a set of vertices to be fixed or anchored. For this research, the goal is to deform a 3D mesh using the deformation from a SSM, which is a translational deformation in X, Y, and Z. This is incompatible with the approach by Masuda et al. To alleviate this issue, the inventor's research has replaced the interpolation of the local rotations with an as-rigid-as-possible (ARAP) energy minimization framework. In this approach, we have the original positions of the 3D mesh S and the final desired positions of the 3D mesh S' determined by the deformation of the SSM. The deformation of the CAD design is rigid if there exists a per-vertex rotation matrix $R_i$ such that:

$$p_i'-p_j'=R_i(p_i-p_j), \forall j \in N(i) \qquad \text{(Eq. 6)}$$

In other words, the above equation is specifying that the difference in edge length of the final position of vertex i and vertex j (see FIG. 20) should be equal to the original edge length of vertex i and vertex j multiplied by the rotation matrix. When the deformation is non rigid, we can still find the best approximating rotation matrix $R_i$ that fits the above equation in a weighted least squares sense, i.e. minimizes:

$$E(C_i, C_i')=\Sigma_{j \in N(i)} w_{ij} \|(p_i'-p_j')-R_i(p_i-p_j)\|^2 \qquad \text{(Eq. 7)}$$

ACAP employs an as-rigid-as-possible (ARAP) energy minimization framework for surface deformation (see Sorkine and Alexa, *As-rigid-as-possible surface modeling*, 2007), extended to include both volume and form preservation through the use of user-selected constraints on the input 3D mesh.

Figure 20:
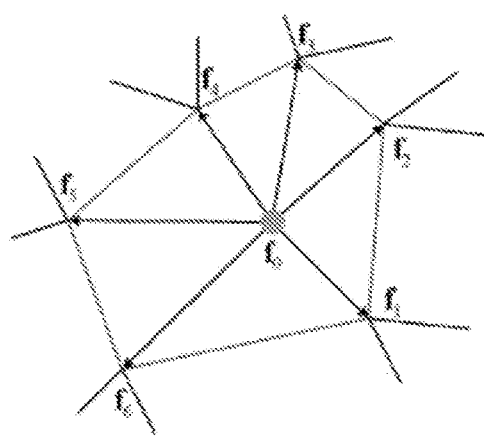
FIG. 20 is a view of a vertex cell employed in the method of this embodiment.
Figure 21A:
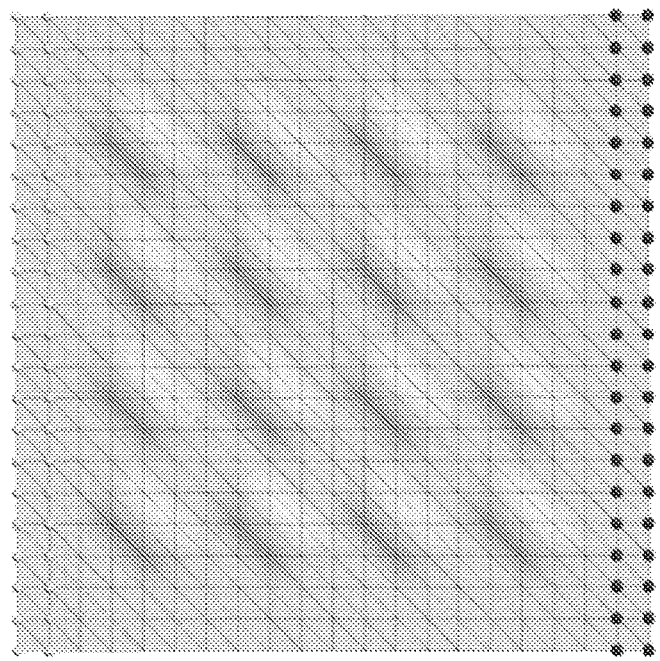
Figure 21B:
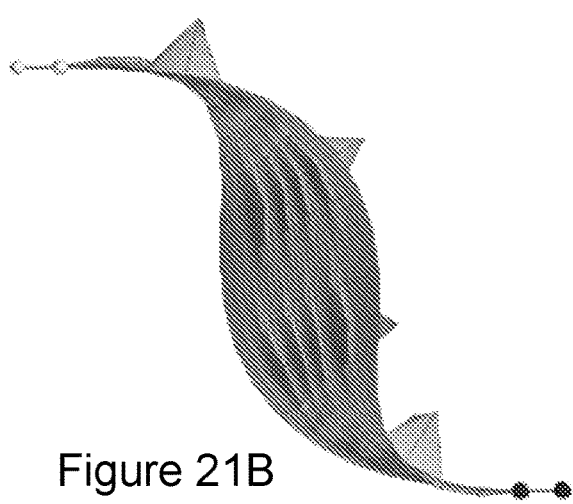
Figure 21C:
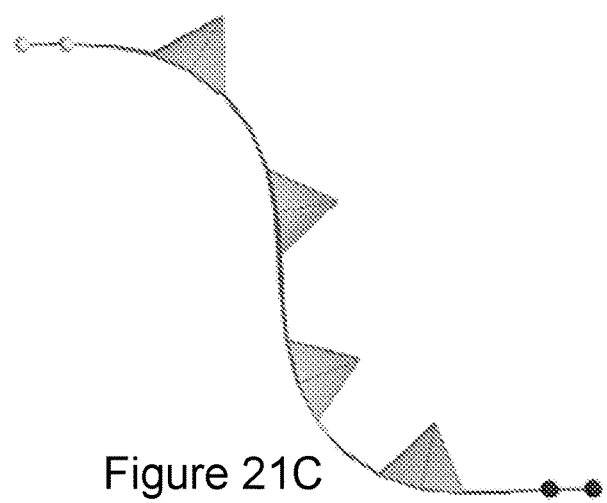

ACAP 3D mesh deformation has two main steps: i) the approximation of the local rotations for a vertex cell, and ii) the estimation of the vertex positions by solving a Laplacian system. (FIG. 20 is a view of such a vertex cell.) The iterative estimation for the local rotations follows the known as As-Rigid-As-Possible (ARAP) as described above, but ACAP varies the Laplacian system to include user-selected or defined constraints that allow for form and position constraints to be added. ACAP involves directly minimising the stretching and/or bending energy to achieve a realistic surface deformation that preserves local detail (i.e. local rotations). To preserve local rigidity, the surface is split into overlapping cells and the transformation in each cell is minimized to be as-rigid-as-possible. A cell, in this example, covers the triangles incident upon a vertex, or the one-ring neighbourhood of a vertex. Therefore, given the cell $C_i$ corresponding to vertex i that deforms to $C_i'$, if that transformation is perfectly rigid there exists a rotation $R_i'$ such that:

$$p_i'-p_j'=R_i(p_i-p_j), \forall j \in N(i) \qquad \text{(Eq. 8)}$$

It should be noted that $(p_i-p_j)$ is essentially the edge length $e_{ij}$, so the ARAP surface deformation naturally preserves the edge length of the mesh. This leads to an energy function that is at a minimum when the rigidity of maximized:

$$E(C_i, C_i')=\Sigma_{j \in N(i)} w_{ij} \|(p_i'-p_j')-R_i(p_i-p_j)\|^2 \qquad \text{(Eq. 9)}$$

By summing the energy functions from all cells, a global energy functional is obtained:

$$E(S')=\Sigma_{i=1}^n w_i E(C_i, C_i')=\Sigma_{i=1}^n w_i \Sigma_{j \in N(i)} w_{ij} \|(p_i'-p_j')-R_i(p_i-p_j)\|^2 \qquad \text{(Eq. 10)}$$

This energy functional is non-linear and depends only on $p_i'$, the new positions of the vertices. To solve this non-linear system, a two-stage optimisation scheme is proposed to iteratively decrease the energy which is achieved by separating the optimization of $R_i$ from the optimization of $p_i'$, specifically, given vertex positions, the optimal rigid transformation $R_i$ is found, this is then back-substituted into the system and the optimal vertex positions $p_i'$ are solved.

One of the critical components of ACAP, similar to ARAP, is the best approximation of the per-vertex rotation matrix, $R_i$, which preserves the local rigidity of the cell. For convenience, the edge $e_{ij}:=p_i-p_j$ and similarly for $e_{ij}'$ for the deformed cell $C_i'$.

$$\sum_j w_{ij}(e_{ij}' - R_i e_{ij})^T (e_{ij}' - R_i e_{ij}) = \quad \text{(Eq. 11)}$$

$$\sum_j w_{ij}(e_{ij}'^T e_{ij}' - 2e_{ij}'^T R_i e_{ij} + e_{ij}^T R_i^T R_i e_{ij}) =$$

$$\sum_j w_{ij}(e_{ij}'^T e_{ij}' - 2e_{ij}'^T R_i e_{ij} + e_{ij}^T e_{ij})$$

The terms that do not contain $R_i$ are constant in the minimization and therefore can be dropped. The equation then becomes:

$$\underset{R_i}{\text{argmax}} \sum_j = 2w_{ij} e_{ij}'^T R_i e_{ij} = \underset{R_i}{\text{argmax}} \sum_j w_{ij} e_{ij}'^T R_i e_{ij} = \quad \text{(Eq. 12)}$$

$$\underset{R_i}{\text{argmax}Tr} \left( \sum_j w_{ij} R_i e_{ij} e_{ij}'^T \right) = \underset{R_i}{\text{argmax}Tr} \left( R_i \sum_j w_{ij} e_{ij} e_{ij}'^T \right)$$

The covariance matrix, denoted $S_i$, is as follows:

$$S_i = \sum_{j \in N(i)} w_{ij} e_{ij} e_{ij}'^T = P_i D_i P_i'^T, \quad \text{(Eq. 13)}$$

where $D_i$ is a diagonal matrix containing the weights $w_{ij}$, $P_i$ is the $3 \times |N(v_i)|$ containing $e_{ij}$s as columns and similarly for $P_i'$. $R_i$ can then be derived from the singular value decomposition of $S_i = U_i \Sigma_i V_i^T$:

$$R_i = V_i U_i^T \quad \text{(Eq. 14)}$$

up to changing the sign of the column $U_i$ corresponding to the smallest singular value, such that $\det(R_i)>0$.

The selection of per-edge weights $w_{ij}$ and per-cell weights $w_i$ facilitates making the deformation energy as robust against variations in topology as possible. FIGS. 21A to 21E illustrate the deformation of a test piece, representing respectively the original mesh, uniform weights, co tan weights, uniform weights and co tan weights. The region highlighted with dark dots remains fixed; the region highlighted with light dots is deformed [0.5 −1 −1] in the x, y, z directions respectively, thus illustrating how the choice of weights can affect the deformation of the mesh under the same displacements. The selection of weights should compensate for non-uniformly shaped cells, such as coarsely meshed shapes with large triangle areas, and prevent discretization bias. The cotangent weight formula for $w_{ij}$ may be used:

$$w_{ij} = \tfrac{1}{2}(\cot \alpha_{ij} + \cot \beta_{ij}) \quad \text{(Eq. 15)}$$

From FIGS. 21A to 21E, it may be seen that the cotangent weights provide a more reasonable deformation over the uniform weighting. In Equation 15, $\alpha_{ij}$ and $\beta_{ij}$ are the angles opposite the mesh edge (i, j). An alternative approach is to utilise the area-corrected edge weights $$w_{ij}' = \left(\frac{1}{A_i}\right) w_{ij},$$

where $A_i$ is the Voronoi area of cell $C_i$.

ACAP 3D mesh deformation preserves local rigidity around a cell which constitutes the one-ring neighbourhood of a vertex. However, while this preserves the edge length it does not preserve the volume of the mesh. Depending on the type of object being deformed this can be a critical issue, such as if the object being deformed is a planar surface with local detail then there is no necessity for volume preservation. However, if the object has a thickness or in the case of the in-ear device, which has a hollow shell with a functional wall thickness, then it is important to preserve that volume. The ARAP framework may be extended to account for internal volume through the use of tetrahedral meshes (and a volumetric mesh, M, is compatible with the surface mesh, S, on its boundary (i.e. $\delta M=S$)), so that the internal volume is preserved as much as possible during the deformation stage.

Figure 22C:
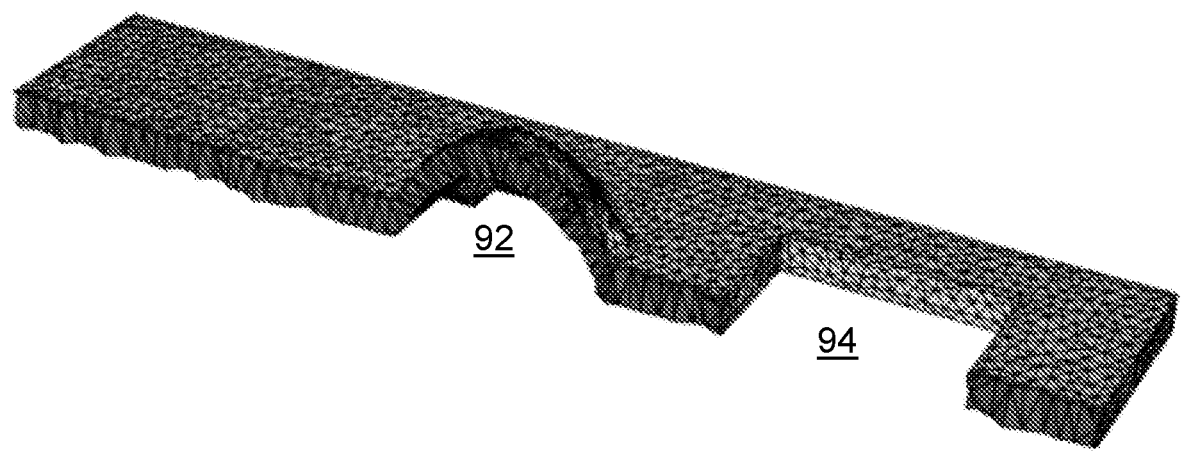

The ACAP mesh deformation aims to preserve the edge lengths of the mesh, such that the rigidity of the overall elements remains the same, to provide realistic deformation. However, using a standard mesh it is also desirable to take account of the internal volume. FIGS. 22A to 22C illustrates tetrahedral mesh generation to preserve the volume of the mesh during the ACAP deformation, FIG. 22A illustrating an original view, FIG. 22B an 'original split view' and FIG. 21C a 'tetrahedral split view.' From FIG. 22B, it will be seen that the original mesh once split does not have any connectivity/edges on the internal, meaning that during the deformation process the algorithm only the external connectivity is preserved. This may be sufficient for standard meshes, but during large and complex deformations this could result in self-intersections or failures. In FIG. 22C, it can be seen that the tetrahedral mesh consists of the same external vertices and faces as the original mesh but has connectivity in the internal volume. This means that ACAP as described thus far, though preserving edge-lengths, will now take account of the internal volume and prevent self-intersections during large deformations.

To generate the tetrahedral mesh, the TetGen method may be used. TetGen is a program to generate tetrahedral meshes of any 3D polyhedral domains. TetGen generates exact constrained Delaunay tetrahedralizations, boundary conforming Delaunay meshes, and Voronoi partitions. To provide compatibility with the original surface, the TetGen is restricted to not remesh the surface, so that the algorithm will not introduce new vertices into the mesh, therefore the volumetric mesh, M, is compatible with the surface mesh, S, on its boundary (i.e. $\delta M=S$). The outcome of this process is the original vertices and faces, but with an additional tetrahedral connectivity matrix. The tetrahedron connectivity is utilised in the energy minimisation as opposed to the standard triangular connectivity.

As this embodiment attempts to maximize preservation of the shape of important features of a design, deformation in user-defined areas should be limited. To allow for user-defined constraints the second stage of the ACAP process, solving the Laplacian system for position estimation is replaced with a constraint-based solution with a variety of user-defined constraints which will allow for a multitude of possible designs. Specifically, a significant feature of ACAP is in extending the process of Masuda et al. to incorporate local rotation approximation through ARAP energy minimization guided by the deformation field of the SSM. Contrary to Masuda et al. where the local rotations are interpolated from an axes-angle transformation and require at least one vertex to be fixed. The integration of ARAP energy with form-preservation does not require vertices to be explicitly fixed and allow for deformations to be defined in X,Y,Z translation form which is compatible with our SSM deformation field.

ARAP mesh deformation minimizes the energy such that the edge-lengths of the mesh are preserved. The advantage of this approach is that it will converge to something, but this does not guarantee that the form will be preserved so the solving of the Laplacian system is adapted such that it preserves form regions.

Masuda et al. (2007) use a Laplacian mesh deformation approach with rotation and form constraints that explicitly preserve pre-determined regions of a mesh. However, the difficulty with their approach is that the deformations have to be provided as quaternion (axis, angle) rotations as opposed to translational and require at least one vertex to be explicitly fixed. The present embodiment uses a deformation field obtained from the morphing of a statistical shape model (SSM), which is a three-dimensional translational deformation field. The approach of Masuda et al. (2007) is not directly compatible with this approach, as Masuda et al. (2007) aim to initiate the deformation with the rotation and translation provided by the user which is then interpolated over the surface. Hence, according to the present embodiment, the approach of Masuda et al. (2007) is modified by incorporating an iterative rotation estimation (described previously) such that the deformation field can be directly used without having to explicitly provide per-vertex rotations. Therefore only the equation below from Masuda et al. (2007) is relevant:

$$\begin{cases} q_i - q_j = 0 \, (i, j \in \wedge_F; (i, j) \in T_F) \\ p_i - p_j = s_f R(n_i, \theta_i)(p_i^o - p_j^o) \, (i, j \in \wedge_F; (i, j) \in T_F) \end{cases} \quad \text{(Eq. 16)}$$

Figure 23:
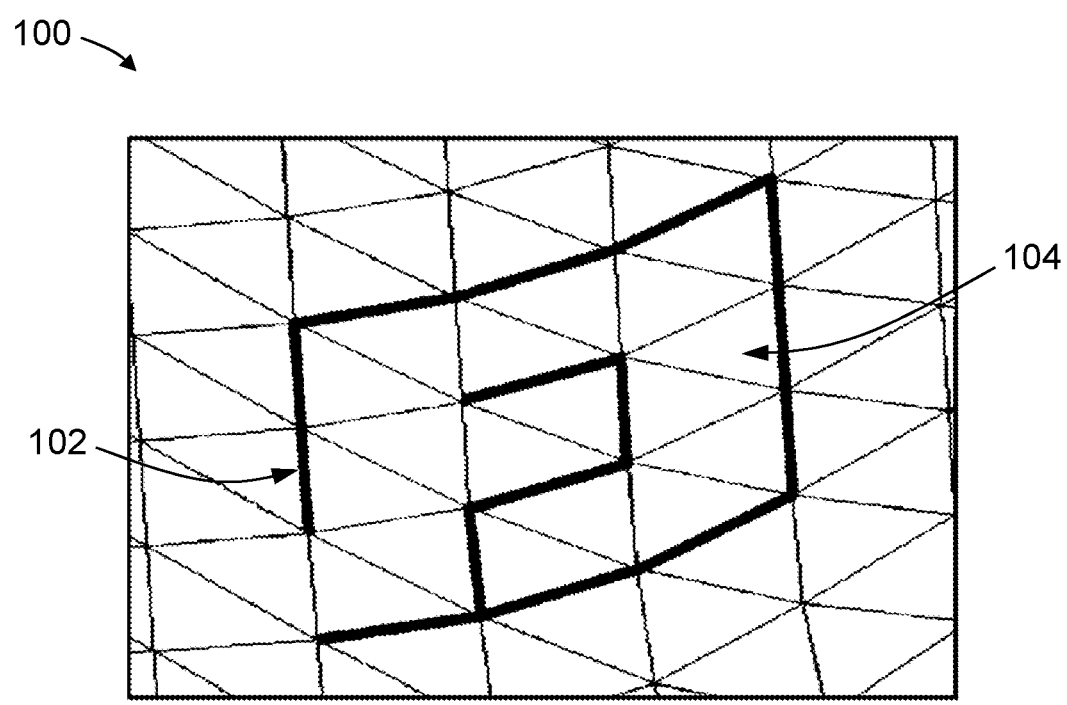
FIG. 23 illustrates a spanning tree according to this embodiment, being a minimum representation of the connectivity in a 3D mesh region such that repeated edges are eliminated in the selected region.

$R(n_i, \theta_i)$ is the per-vertex rotation matrix that is interpolated over the surface such that the normals or frame of each cell is preserved (cf. Equation 8: ARAP finds a rotation for each vertex that preserves the rigidity of each cell); $(q_i-q_j)$ is the difference between neighbouring rotation matrices, so this part of the equation states that the difference in rotation for a form region should be zero, i.e. the region should rotate together, similar to ARAP; $s_f$ is a scale factor that the user can use to vary the size of a form region, but this is not essential. An important component of the method of Masuda et al. (2007) is the use of a minimum spanning tree to reduce the complexity of the least-squares solution. Given a predefined form region consisting of vertices and connectivity information (i.e. faces), a minimum spanning tree is a path that traverses the surface in a minimal fashion such that repeated edges are excluded. In Equation 16, the spanning tree edges are represented by $T_F$ and the faces in a form region by $\wedge_F$. FIG. 23 illustrates a 3D mesh region 100 with a spanning tree 102 with a form-feature region 104: a minimum representation of the connectivity in mesh region 100 such that repeated edges are eliminated in the selected region.

To explicitly preserve a form region without having to define rotations for cells, this research takes the per-vertex rotation matrices from the first step of the ACAP process and adds a final step. Taking the per-cell rotation matrices from the ACAP process, a minimum spanning tree is generated from the user-defined form region. A Laplacian least-squares system is then solved using Equation 16 as soft constraints, such that the system becomes:

$$M\tilde{x} = \tilde{b} \quad \text{(Eq. 17)}$$

$$M = \begin{bmatrix} A^t A & C^t \\ C & 0 \end{bmatrix}, \tilde{b} = \begin{bmatrix} A^t v \\ d \end{bmatrix}$$

where $A=L_D$, the cotangent Laplacian matrix, $x=v'$ the new vertex positions, $A^t v$ are the delta coordinates of the mesh, and d are the position constraints. The critical components here are the C and d matrices, which constitute the form matrices. Taking vertex i with corresponding edge vertex j, $C_{i-j}$ becomes:

$$C = \begin{bmatrix} C_{i-j} & 0 & 0 \\ 0 & C_{i-j} & 0 \\ 0 & 0 & C_{i-j} \end{bmatrix} \quad \text{(Eq. 18)}$$

$$C_{i-j} = \begin{pmatrix} \ldots & i & \ldots & i & \ldots \\ 0 & 1 & 0 & -1 & 0 \end{pmatrix}$$

Similarly, for the d matrix, the constraints become:

$$d_{i-j} = R_i(v_i - v_j) \quad \text{(Eq. 19)}$$

By adding these constraints to the Laplacian system such that the M matrix is constructed, the form preserving mesh deformation can be performed using a least-squares solution:

$$v' = M\tilde{b}. \quad \text{(Eq. 20)}$$

Following this process the mesh deformation is complete. To summarize, the following process constitutes the full volume and form preserving ACAP 3D mesh deformation:

| Volume and Form Preserving ACAP Deformation |
|---|
| Data: (V, F) where V is (n × 3) set of vertices and F is (m × 3) set of indices onto vertices, (b, $b_c$) where b are the indices of the constrained vertices, and $b_c$ are the positional constraints.<br>Result: V', the deformed location of the vertices<br>1   if necessary then<br>2     \| Retopologise the input mesh<br>3   End<br>4   Preprocess Form Regions ($E_{form}$)<br>5   Construct spanning tree from form regions<br>6   Solve ACAP system<br>7   while Error is greater than the tolerance do |

| Volume and Form Preserving ACAP Deformation |
| --- |
| 8        | Estimate per-vertex rotations |
| 9        | Solve constrained laplacian system with form regions |
| 10       | Estimate error |
| 11    End | |

By following this process the mesh is deformed to fit the user constraints and can preserve both volume and form in a simple and interactive manner. The following section shows the advantage of this process against standard ARAP deformation.

Figure 24:
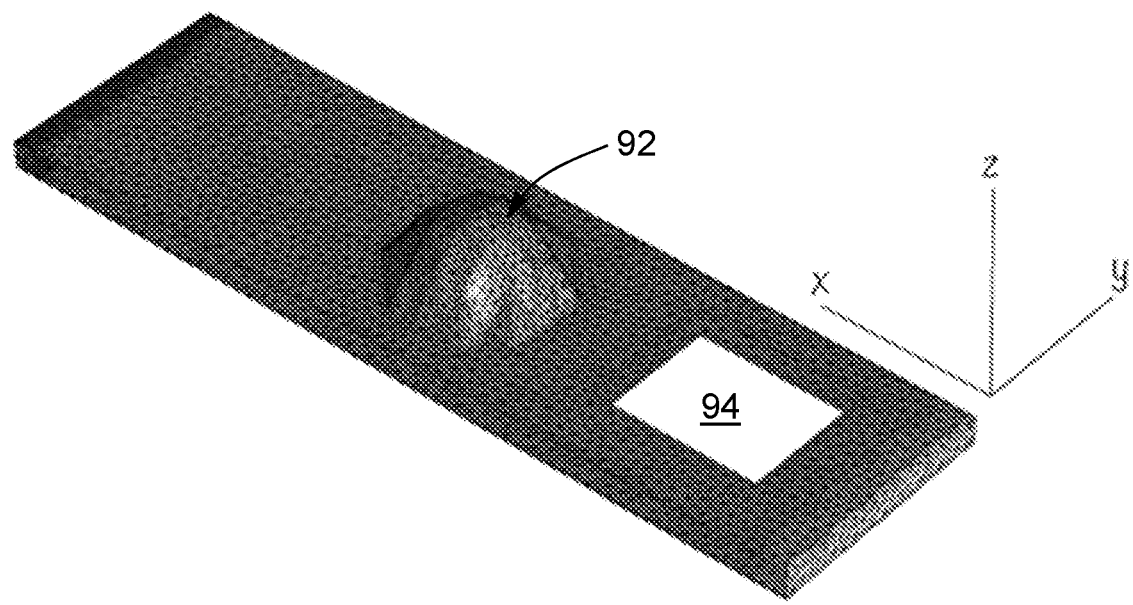
FIG. 24 is a view of deformation of a test piece, with one region remaining fixed and another region deformed [0.5 -1 -1] in the x, y, z directions respectively.

To illustrate the ACAP approach of this embodiment, the sample component of FIGS. 19A and 19B is deformed as set out in FIG. 24. FIG. 24 depicts deformation of a test piece: the region with dark shading (upper left in this view) remains fixed, while the region with light shading (lower right in this view) is deformed [0.5 −1 −1] in the x, y, z direction.

To showcase the importance of the addition of the volumetric informational, the deformation is shown with the original ARAP deformation, the volume preserving ARAP, and the full ACAP process.

Figure 25:
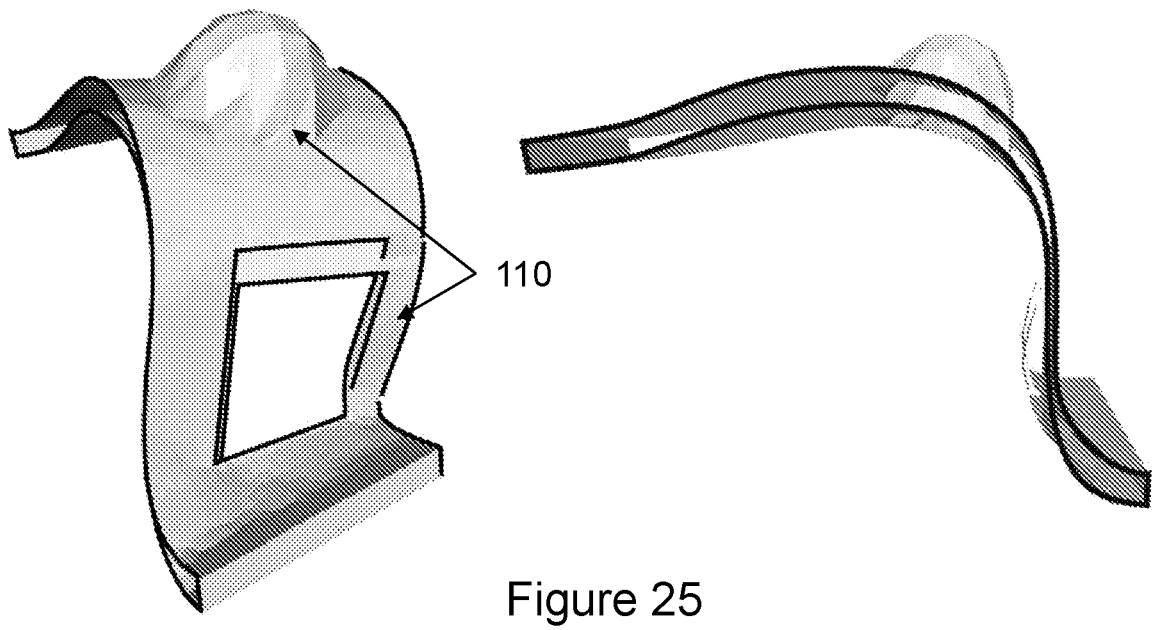
FIG. 25 is a view of ARAP mesh deformation of the background art, showing the limitations in regard to maintaining the internal volume.
Figure 26:
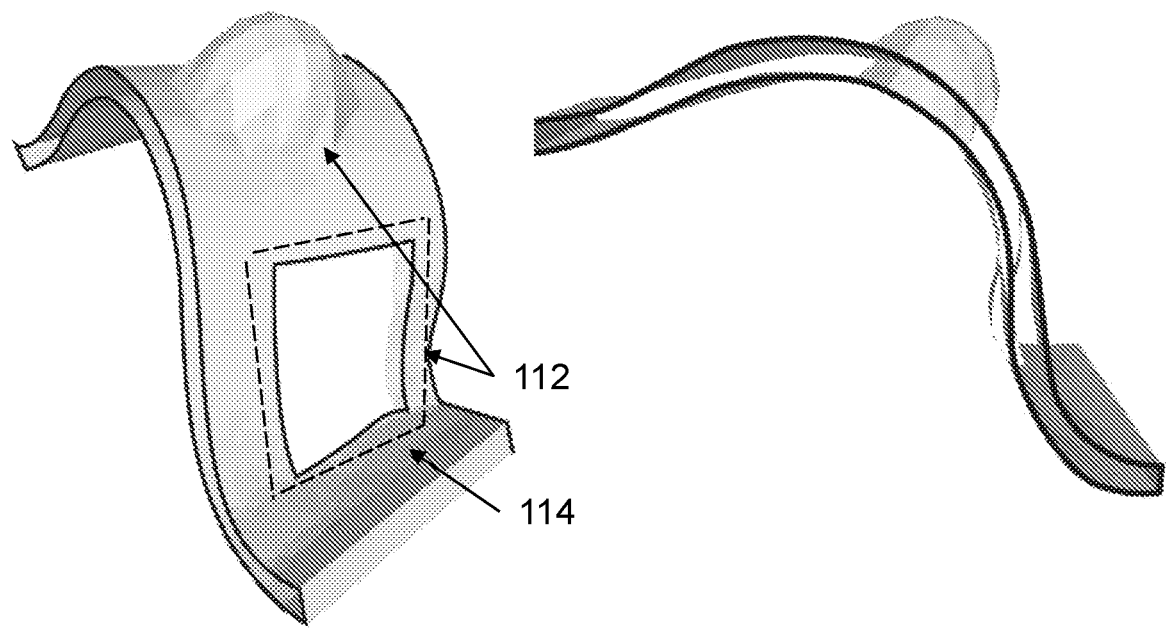
FIG. 26 is a view of ARAP according to this embodiment, including the volume information in the form of the tetrahedral connectivity, showing no self-intersections.

FIG. 25 depicts ARAP mesh deformation of a sample 3D mesh showing the limitations in regard to maintaining the internal volume. As can be seen in this figure, the original ARAP system cannot identify internal volume. The algorithm aims to minimise the edge-lengths of adjacent vertices without taking into account the volume of the mesh. This is clearly shown by removing all internal edges of the model as the deformation exhibits self-intersections 110, which can be seen as variations in shading on the mesh. As discussed previously, the tetrahedral mesh is generated through the use of TetGen, which is a program to generate tetrahedral meshes of any 3D polyhedral domains. By restricting the TetGen algorithm so as not to remesh the surface, the original vertices and faces of the mesh are maintained and the additional tetrahedral connectivity information is passed through the ACAP process. FIG. 26 illustrates the ARAP process including the volume information in the form of the tetrahedral connectivity, and—as will be seen—showing no self-intersections (cf. 112) but with some distortion 114 of the form region.

Figure 27:
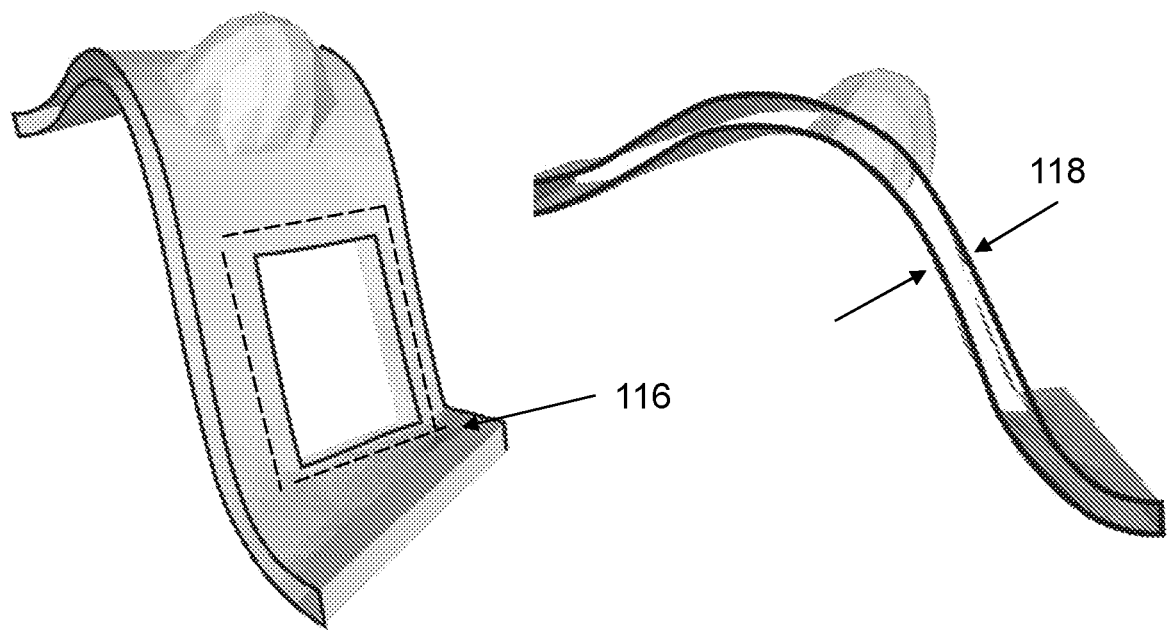
FIG. 27 is a view of ACAP according to this embodiment showing the preservation of both volume and rotation with the critical component being the preservation of the form of the designated region.

By adding volumetric information, the ARAP system is able to preserve the internal volume and prevent self-intersections. This is particularly important as the complexity of models increases, it is imperative that self-intersections do not occur. By analysing the form region, it can be seen that it has become distorted which is not ideal for this research. It has been determined that to explicitly preserve the form a post-processing stage is added that utilises the minimum spanning tree of the form region and the rotation matrices calculated from the ARAP process to determine the exact shape whilst maintaining the rotation of the original deformation. FIG. 27 depicts the ACAP process showing the preservation of both volume and rotation, with the preservation of the form of designated region 116 and uniform thickness at 118.

As can be seen, both the rotation and form of the designated area are preserved. Of importance here is that the normal to the surface is preserved whilst the form regions remain the original size but follow the natural rotations of the deformation.

Thus, according to this embodiment, an alternative approach to mass-customization of products from 3D scan data is constructed. Contrary to the background art parametric or generative approaches, this embodiment opts for direct surface deformation using the SSM as the guide. By utilising this approach, the user can work with standard CAD data without the need to pre-program landmarks or cut-planes. Using a simple set of tools, the user is able to identify form regions that preserve the functionality of a design, i.e. mounting holes for electronics or clearance holes for assemblies.

ARAP surface deformation is a widely used technique that provides realistic 3D mesh deformation without the need to provide rotations per-vertex. The two-stage optimization allows for the per-vertex rotations to be fitted such that the normal to the surface is preserved. However, the standard ARAP process has no way to preserve internal volume and can often lead to self-intersections depending on the shape of the object being deformed. This can be clearly seen in FIG. 25, when the sides connecting the two surfaces of the test piece (cf. FIG. 19) are removed there is no way for the algorithm to know the internal volume and therefore self-intersections occur. This is detrimental to the applicability to this research as self-intersections or inversions will cause the mesh to become un-printable, meaning it will not be possible to 3D print the output of the process, and the shape may not fit the 3D scan as expected.

Figure 28C:
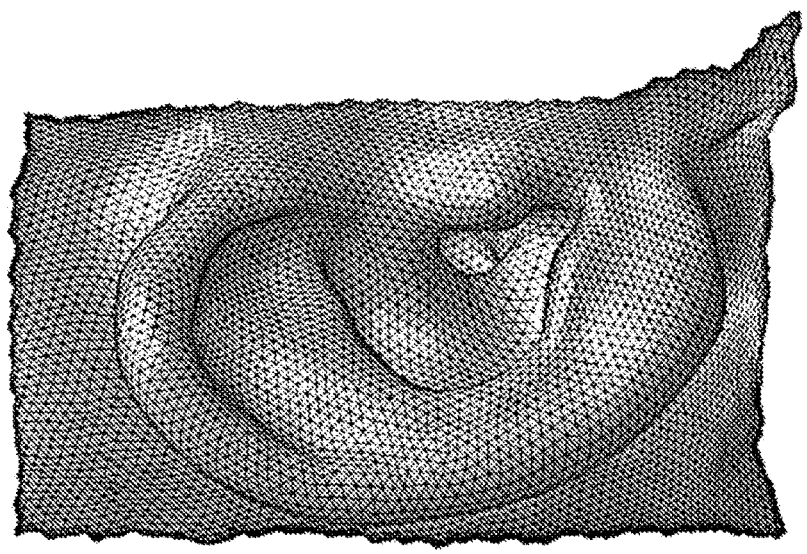
FIGS. 28A to 28C illustrate the fitting of the SSM to the input 3D scan according to this embodiment.
Figure 28B:
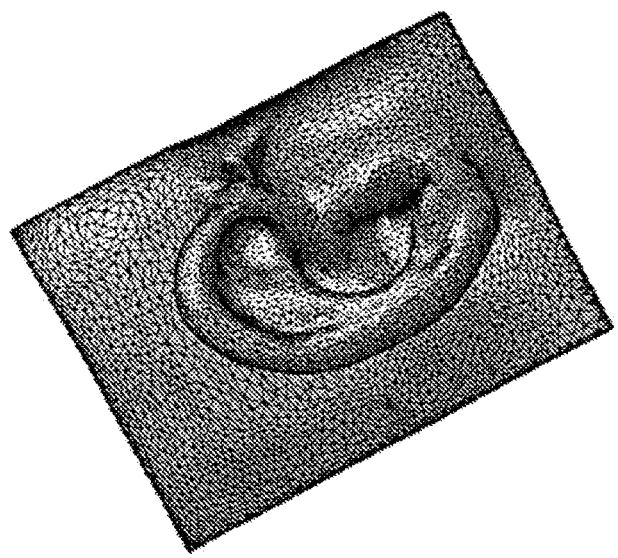
Figure 28A:
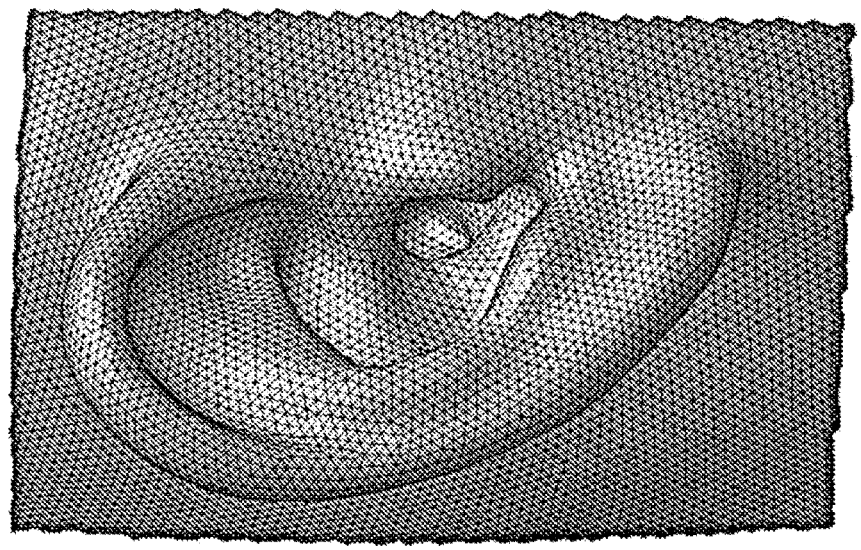

FIGS. 28A to 31C further illustrate the use of the SSM in predicting the shape of an ear, the resultant deformation field, the registered earpiece, and ACAP deformation according to this embodiment. FIGS. 28A to 28C illustrate the fitting of the SSM to the input 3D scan according to this embodiment. FIG. 28A shows the mean shape of the SSM, FIG. 28B shows the input 3D scan in its raw state, i.e. directly from the 3D scanner, and FIG. 28C shows the fitted 3D scan using the SSM, illustrating the improvement in topology, orientation, noise control, and occlusion. The topology of the SSM is transferred to the input 3D scan (from 48), with the benefit that the processing becomes simpler, and the orientation of the input 3D scan is now constrained to the SSM.

Figure 29C:
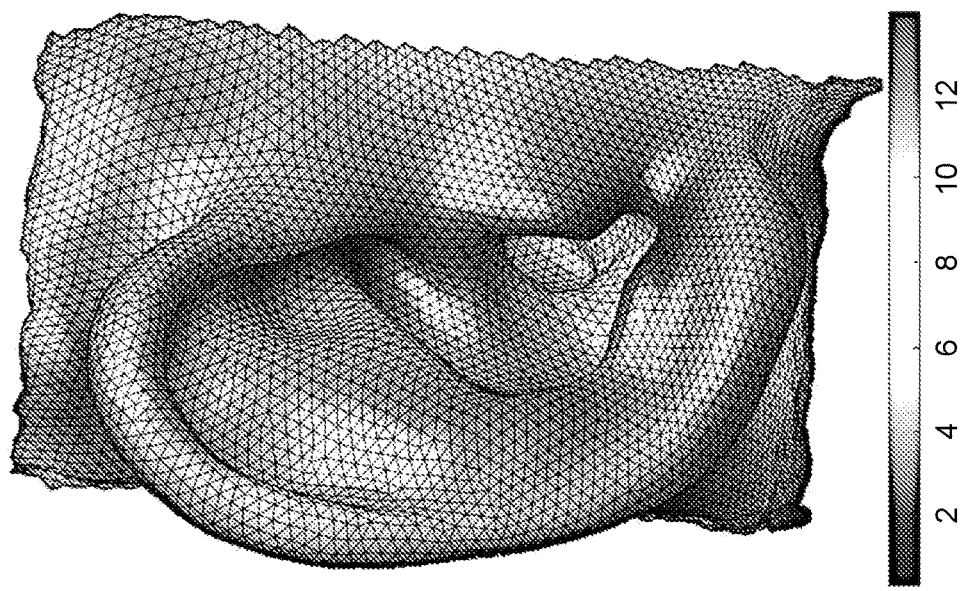
FIGS. 29A to 29C illustrate the deformation field according to this embodiment, being the 3D (x,y,z) change in shape from the mean shape of the SSM to the new 3D scan.
Figure 29B:
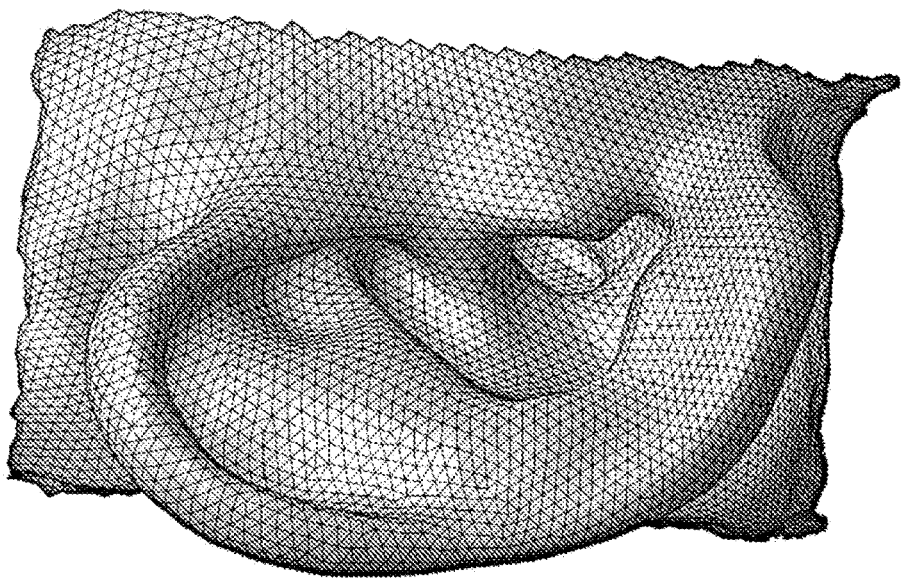
Figure 29A:
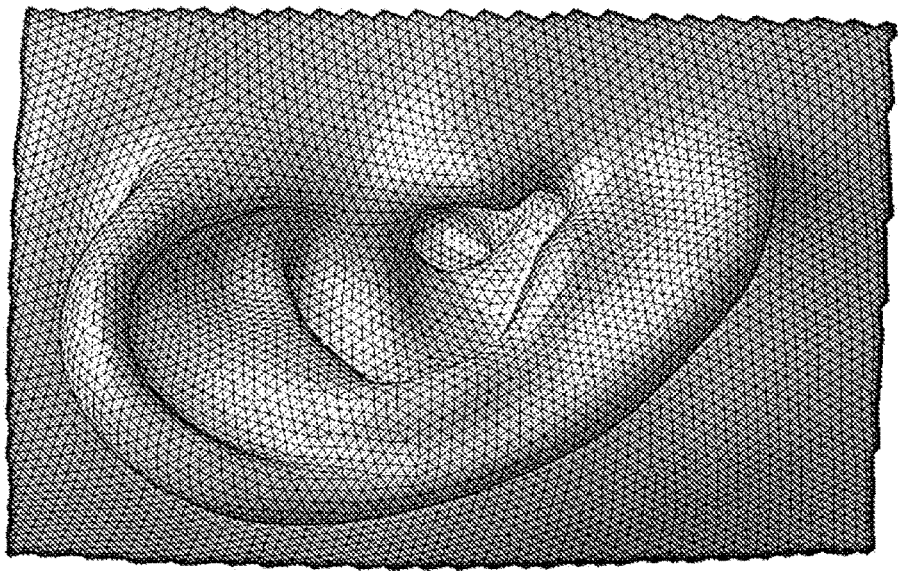

FIGS. 29A to 29C illustrate the deformation field according to this embodiment, being the 3D (x,y,z) change in shape from the mean shape of the SSM to the input 3D scan (from 48). FIG. 29A shows the mean shape of the SSM, FIG. 29B shows a fitted 3D scan using the SSM, and FIG. 29C shows the deformation field that occurs by deforming the mean shape to match the new fitted model. Thus, if a product is registered to the SSM, the change in shape can be directly related to the product.

Figure 30:
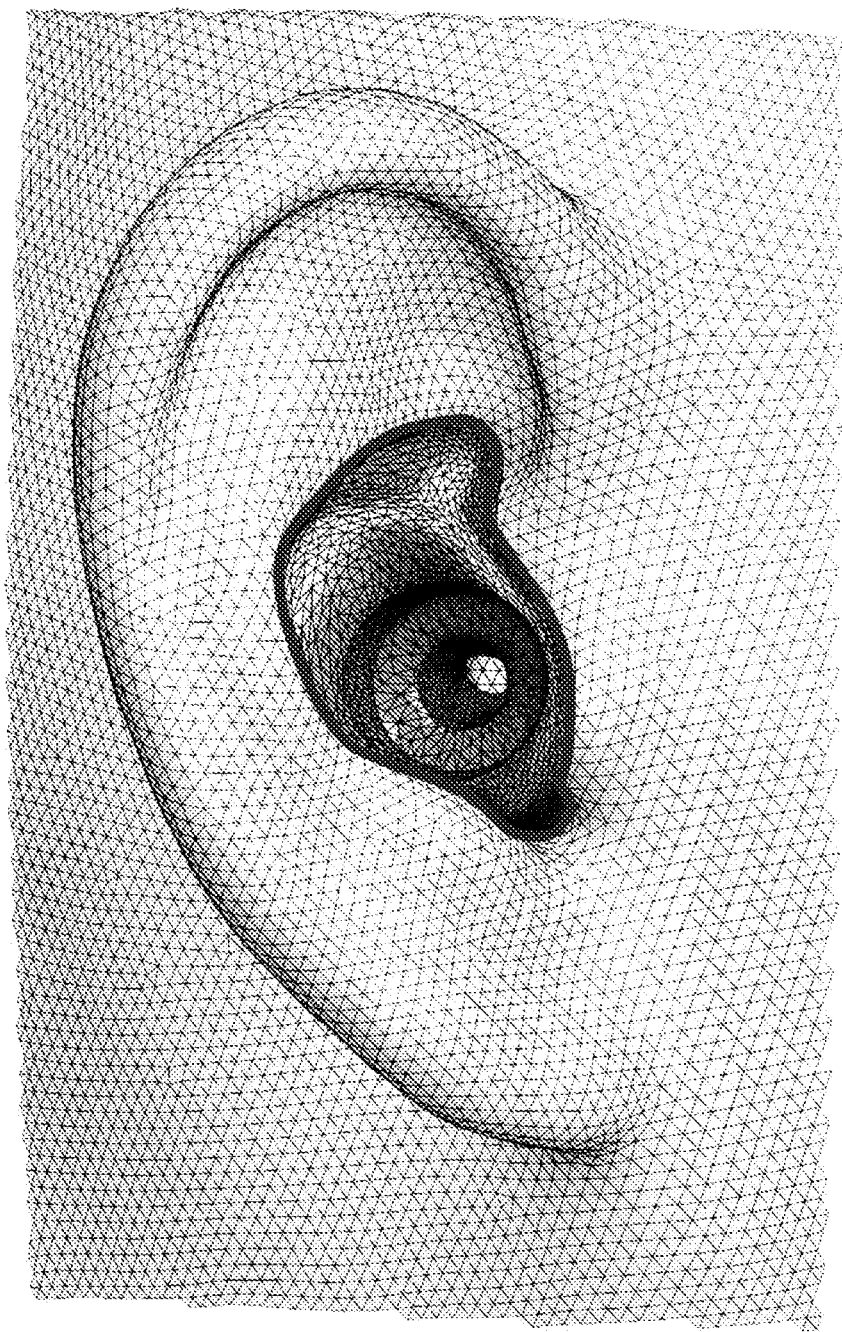
FIG. 30 is a view of the mean shape of the SSM with an earpiece designed using CAD software of the background art.

FIG. 30 illustrates the mean shape of the SSM with an earpiece designed using CAD software of the background art, registered with the mean shape of the SSM. This figure illustrates a simple design, comprising a mount for the earpiece and the acoustic passage.

Figure 31C:
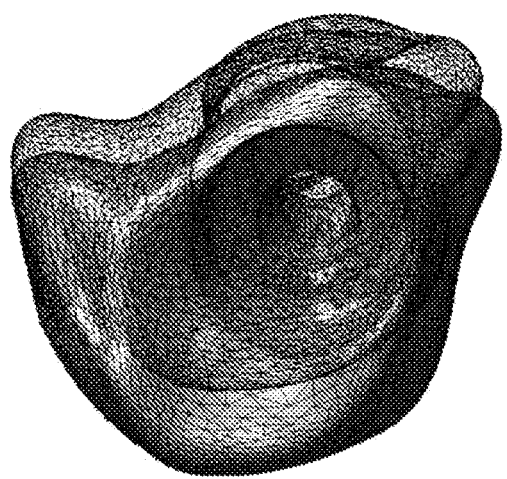
FIGS. 31A to 31C illustrate the ACAP deformation of the earpiece of FIG. 30 according to this embodiment relative to the input 3D scan.
Figure 31B:
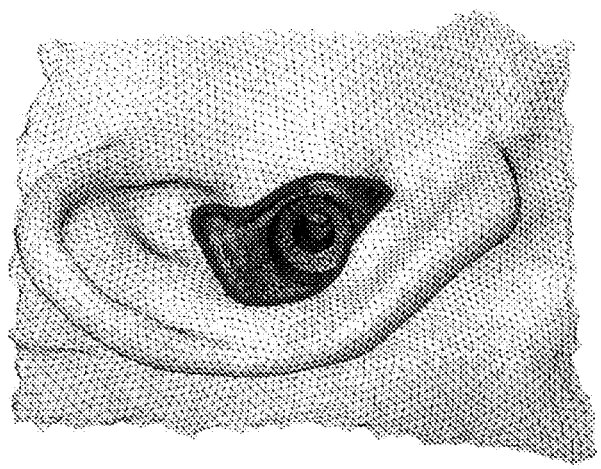
Figure 31A:
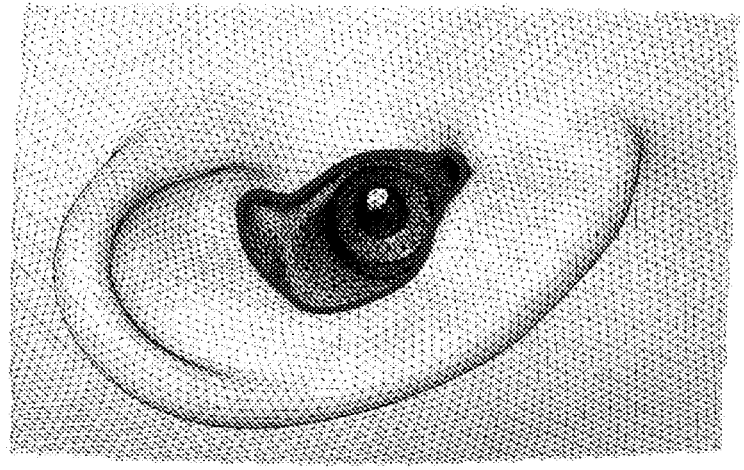

FIGS. 31A to 31C illustrate the ACAP deformation of the earpiece of FIG. 30 according to this embodiment relative to the input 3D scan. FIG. 31A shows the deformed earpiece where the preserved area is the cylindrical mounting hole and entrance to the acoustic cavity, FIG. 31B shows this earpiece registered with the input 3D scan, showing an exact fit, and FIG. 31C a comparison of the original earpiece, shown transparent, and the newly deformed earpiece, illustrating the large shape deformation that has occurred from the mean shape in both form and position, though the ACAP mesh deformation process has preserved the desired area whilst accurately deforming to fit the input 3D scan. It will be noted that the shape of the mounting area is preserved and the change in volume is at a minimum through the algorithm. Also, the change in shape is from the mean to approximate $-2\sigma$, which is a substantial step size, and suggests that the method of this embodiment handles relatively extreme cases well.

As the standard ARAP is not fully applicable to this embodiment, it has been determined that volume and form preserving extensions were required. Volume preservation is required such that no self-intersections occur during large deformation or with complex parts and that the overall thickness of the part remains the same where possible. As the goal of this research is to deform a functional part it is imperative that regions that have an engineered purpose remain within tolerance such that components can be fitted to the part or the part can fit within the specified region, therefore form preservation is critical. In this embodiment, it has been determined that by generating the tetrahedral mesh using Tetgen and restricting the TetGen algorithm to not remesh the surface, the original vertices and faces of the triangular mesh are maintained and the generated set of tetrahedral connectivity information is used in the energy minimization process. This therefore allows the ARAP system to take account of that edge-length, thus preserving the internal volume as shown in FIG. 26.

The ACAP mesh deformation process was developed to contain volume, rotation and form preservation, thereby allowing the user to add constraints to the Laplacian system such that form preservation is achieved. These constraints are simple and interactive, giving the user the ability to manually select critical regions of the design which are then automatically processed into the minimum spanning tree (cf. FIG. 23). By doing this the method of this embodiment is able to preserve the region such that it rotates with the natural rotations of the surface. This is advantageous for in-ear device design as the form region should conform with the deformations of the SSM. It is also possible to add further constraints to the system which control the final positioning of the form region, such as restricting the motion to a certain normal angle, or following a direction to a line. However, for in-ear device design the natural form region preservation is sufficient.

The advantage of the ACAP process is that it will always converge to something, which can give information on the limitations of the design or topology of the mesh. For example, with the human ear, there is a significant amount of variation in terms of shape between extremes of the population, so there may be situations where the algorithm cannot physically deform the mesh to fit the desired target, which will give information on the limitations of the design. The ACAP process is also relatively simple and can be extended to include further constraints relating to the final positioning of the form region. By varying the edge weights it is also possible to change how the surface deforms which gives the user extra control for specialised applications, i.e. specifying custom edge weights to generate a certain deformation that may be related to material properties.

Figure 32:
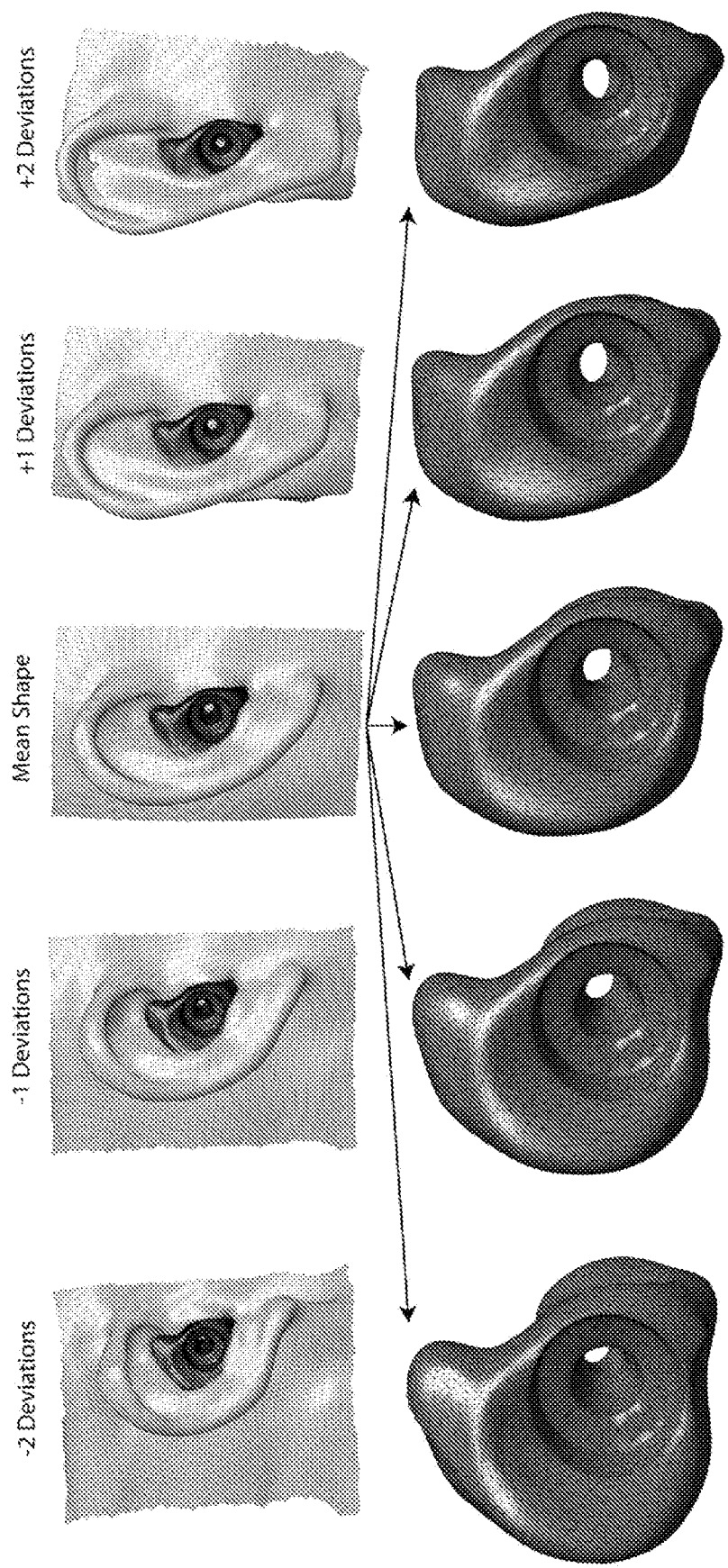
FIG. 32 is an example illustrating an SSM generated from a database of 100 3D ear scans and associated in ear devices formed utilising the SSM, showing the mean shape and variations at $\mp 1\sigma$ and $\mp 2\sigma$.

A preferred embodiment of the ACAP process is applied to customising fitting of in-ear devices—or rather customising a housing for an in-ear device to fit to an individual's ear. An example of variation in shape of in-ear devices produced using the ACAP customisation methodology as described above is illustrated in FIG. 32. FIG. 32 shows the SSM mean shape, and associated device fitted to this shape, and for comparison shows shapes and associated in-ear devices fitted to shapes at $\mp 1\sigma$ and $\mp 2\sigma$ variance form the mean shape. From this figure one can observe how the shape of the in-ear device is modified to fit the different shape variations, while preserving the key structural features of the bore and cavity within the device.

It will be understood to those persons skilled in the art of the invention that many modifications may be made without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will also be understood that the reference to any prior art in this specification is not, and should not be taken as an acknowledgement or any form of suggestion that, the prior art forms part of the common general knowledge in any country.

The invention claimed is:

1. A customization method for producing a product design customized for a selected environment, the method comprising:
   determining a deformation field between a mean shape of a 3D statistical shape model (SSM) of the selected environment to a new 3D scan by fitting the SSM to the new 3D scan data; and
   deforming a mesh of an existing Computer Aided Design (CAD) model of a product according to the deformation field including (i) estimating and preserving at least one local rotation by preserving at least one normal to a surface of the product, and (ii) preserving a form of one or more selected components of the product using at least one of the preserved local rotation.

2. The customization method as claimed in claim 1, wherein deforming the mesh further includes approximating local rotations for each of a plurality of vertex cells, and estimating vertex positions by solving a Laplacian system.

3. The customization method as claimed in claim 2, wherein deforming the mesh further includes varying a Laplacian system according to user-selected constraints.

4. The customization method as claimed in claim 1, wherein the method includes generating the SSM of the selected environment from 3D scan data from one or more 3D scans of the selected environment.

5. The customization method as claimed in claim 4, wherein the method includes creating a deformation field by registering the 3D scan data to the SSM.

6. The customization method as claimed in claim 4, wherein the method includes creating the SSM by registering the 3D scan data to the SSM such that the SSM comprises a 3D model of a same topology and distribution as the 3D scan data.

7. The customization method as claimed in claim 1, wherein the method includes minimizing stretching and/or bending energy to achieve realistic surface deformation.

8. The customization method as claimed in claim 1, wherein the method includes preserving local rigidity by splitting a surface of the product into overlapping cells and minimizing a transformation in each of the cells to be as-rigid-as-possible.

9. The customization method as claimed in claim 8, wherein a cell covers triangles incident upon a vertex, or a one-ring neighbourhood of a vertex.

10. The customization method as claimed in claim 1, wherein the method includes iterative rotation estimation.

11. The customization method as claimed in claim 1, wherein the method includes generating a tetrahedral mesh, constrained to preserve volume and to not introduce new vertices into the mesh.

12. The customization method as claimed in claim 4, wherein the method generates the SSM without employing detection or manual annotation of landmarks.

13. The customization method as claimed in claim 1, wherein the method includes receiving or accessing the CAD model.

14. The customization method as claimed in claim 1, wherein The CAD model may have been prepared using any standard Computer Aided Design environment.

15. The customization method as claimed in claim 1, wherein the product is an in-ear device and the selected environment is a portion of an ear that is to accommodate the in-ear device.

16. A customization apparatus for producing a product design customized for a selected environment, the apparatus comprising:

a statistical shape model (SSM) generator configured to determine a deformation field between a mean shape of a 3D statistical shape model (SSM) of the selected environment to a new 3D scan by fitting the SSM to the new 3D scan data; and a mesh deformer configured to deform a mesh of an existing Computer Aided Design (CAD) model of a product according to the deformation field including (i) estimating and preserving at least one local rotation by preserving at least one normal to a surface of the product, and (ii) preserving a form of one or more selected components of the product using at least one of the preserved local rotation.

17. The customization apparatus as claimed in claim 16 wherein the statistical shape model generator is further configured to generate the SSM of the selected environment from 3D scan data for one or more 3D scans of the selected environment.

18. The customization apparatus as claimed in claim 16, wherein the statistical shape model generator includes a pre-processer that uniformly distributes the vertices and faces across 3D scan data while preserving overall features.

19. The customization apparatus as claimed in claim 16, wherein the statistical shape model generator includes a groupwise registrar that non-rigidly registers models to a mean.

20. The customization apparatus as claimed in claim 16, wherein the statistical shape model generator includes a variance analyzer.

* * * * *